United States Patent
Morita

(10) Patent No.: US 9,725,072 B2
(45) Date of Patent: Aug. 8, 2017

(54) VEHICLE CONTROL SYSTEM

(71) Applicant: DENSO CORPORATION, Kariya-city, Aichi-pref. (JP)

(72) Inventor: Yasuo Morita, Toyohashi (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 49 days.

(21) Appl. No.: 14/761,024

(22) PCT Filed: Dec. 12, 2013

(86) PCT No.: PCT/JP2013/007319
§ 371 (c)(1),
(2) Date: Jul. 15, 2015

(87) PCT Pub. No.: WO2014/112005
PCT Pub. Date: Jul. 24, 2014

(65) Prior Publication Data
US 2015/0329081 A1    Nov. 19, 2015

(30) Foreign Application Priority Data
Jan. 16, 2013   (JP) .................................. 2013-005571

(51) Int. Cl.
G05D 1/00    (2006.01)
G05D 3/00    (2006.01)
(Continued)

(52) U.S. Cl.
CPC .......... B60R 25/245 (2013.01); B60R 25/241 (2013.01); G01S 5/02 (2013.01);
(Continued)

(58) Field of Classification Search
CPC ... B60R 25/245; B60R 25/241; H04B 17/318; G01S 5/02; H04W 4/046; H04W 64/00; H04W 84/10; H04M 1/6075
See application file for complete search history.

(56) References Cited

U.S. PATENT DOCUMENTS

| 5,239,684 A | 8/1993 | Ishikura |
| 2003/0134657 A1* | 7/2003 | Norta ........................ G01S 5/02 455/550.1 |

(Continued)

FOREIGN PATENT DOCUMENTS

| JP | H03049434 A | 3/1991 |
| JP | 2005-005902 | * 1/2005 |

(Continued)

OTHER PUBLICATIONS

International Search Report and Written Opinion (in Japanese with English Translation) for PCT/JP2013/007319, mailed Mar. 18, 2014; ISA/JP.

*Primary Examiner* — Calvin Cheung
*Assistant Examiner* — Paula L Schneider
(74) *Attorney, Agent, or Firm* — Harness, Dickey & Pierce, P.L.C.

(57) ABSTRACT

A vehicle control system including a mobile device and an onboard device is provided. The onboard device performs vehicle control when the onboard device receives an authentication code from the mobile device located within an effective area. The mobile device measures reception strength of a vehicle signal from the onboard device and stores strength information indicating characteristics of the reception strength corresponding to a target distance to the onboard device. The mobile device determines whether or not the mobile device is located within an effective area, based on the reception strength and the strength information. The mobile device acquires correction information indicat- (Continued)

ing characteristics of the reception strength corresponding to a mobile state quantity and corrects the strength information based on the mobile state quantity and the correction information.

7 Claims, 9 Drawing Sheets

(51) Int. Cl.
| | |
|---|---|
| *G06F 7/00* | (2006.01) |
| *G06F 17/00* | (2006.01) |
| *B60R 25/24* | (2013.01) |
| *H04W 4/04* | (2009.01) |
| *G01S 5/02* | (2010.01) |
| *H04B 17/318* | (2015.01) |
| *H04W 64/00* | (2009.01) |
| *H04W 84/10* | (2009.01) |
| *H04M 1/60* | (2006.01) |

(52) U.S. Cl.
CPC .......... *H04B 17/318* (2015.01); *H04W 4/046* (2013.01); *H04M 1/6075* (2013.01); *H04W 64/00* (2013.01); *H04W 84/10* (2013.01)

(56) References Cited

U.S. PATENT DOCUMENTS

| | | |
|---|---|---|
| 2005/0037734 A1 | 2/2005 | Tanaka et al. |
| 2006/0267407 A1 | 11/2006 | Nagaoka et al. |
| 2008/0146196 A1 | 6/2008 | Tanaka et al. |

FOREIGN PATENT DOCUMENTS

| | | |
|---|---|---|
| JP | 2005005902 A | 1/2005 |
| JP | 2005213815 A | 8/2005 |
| JP | 2007002654 A | 1/2007 |
| JP | 2007329786 A | 12/2007 |
| JP | 2009188799 A | 8/2009 |
| JP | 2010133099 A | 6/2010 |
| JP | 2010165313 A | 7/2010 |
| JP | 2011184918 A | 9/2011 |
| JP | 2012122249 A | 6/2012 |

* cited by examiner

VEHICLE CONTROL SYSTEM

CROSS REFERENCE TO RELATED APPLICATIONS

This application is a U.S. National Phase Application under 35 U.S.C. 371 of International Application No. PCT/JP2013/007319 filed on Dec. 12, 2013 and published in Japanese as WO 2014/112005 A1 on Jul. 24, 2014. This application is based on and claims the benefit of priority from Japanese Patent Application No. 2013-005571 filed on Jan. 16, 2013. The entire disclosures of all of the above applications are incorporated herein by reference.

TECHNICAL FIELD

The present disclosure relates to a vehicle control system using wireless communication.

BACKGROUND ART

There is known a keyless entry system or an engine starter system. The keyless entry system performs wireless communication between a mobile device carried by a user in a vehicle and an onboard device mounted on the vehicle. The keyless entry system locks or unlocks a vehicle door when the onboard device receives a unique authentication code from the mobile device. In this case, the engine starter system starts a vehicle machine such as an engine.

This type of vehicle control system includes a mobile-based transmission type and a vehicle-based transmission type. According to the mobile-based transmission type of vehicle control system, for example, the mobile device transmits a wireless signal (mobile signal) when detecting user's manipulation as a trigger such as pressing on the mobile device. The onboard device transmits a wireless signal (vehicle signal) when detecting reception of the mobile signal as a trigger. According to the vehicle-based transmission type of vehicle control system, for example, the onboard device transmits a vehicle signal when detecting user's manipulation as a trigger such as touching a door handle or pressing a starter button in a vehicle compartment. The mobile device transmits a wireless signal (mobile signal) when detecting reception of the vehicle signal as a trigger.

In this vehicle control system, for example, the onboard device determines whether or not the mobile device is located within an effective area around a specified place (vehicular place) in a vehicle. When determining that the mobile device is located within the effective area, the onboard device receives the authentication code and provides vehicle control over a door or an engine.

The effective area is predetermined for each of manufacturers. Too wide an effective area allows the onboard device to communicate with the mobile device distant from the vehicle and increases a risk of permitting a third party near the vehicle to enter or drive the vehicle. Too narrow an effective area necessitates a user to closely approach the vehicle for remote control and increases a risk of degrading usability. For this reason, respective manufactures strictly predetermine the effective area as a distance (between the mobile device and the vehicular place) that avoids these risks.

However, the vehicle control system is reconsidered to replace a dedicated mobile device with a mobile communication terminal such as a mobile telephone or a smart phone. This improves usability because a user need not own a dedicated mobile device in addition to a mobile communication terminal the user already owns.

For example, the mobile communication terminal transmits a mobile signal to the onboard device. A mobile signal transmission output depends on models of mobile communication terminals. The onboard device strictly determines whether or not the mobile communication terminal is located within the effective area, based on the mobile signal reception strength. For this purpose, the onboard device is proposed to previously store correction information that corrects the mobile signal reception strength (e.g., see patent literature 1).

PRIOR ART LITERATURES

Patent Literature

Patent Literature 1: JP-2005-5902A

SUMMARY OF INVENTION

According to studies by the inventor, however, because a conventional vehicle control system allows the onboard device to correct the mobile signal reception strength using correction information statically specified for each model of mobile communication terminal, it has been impossible to strictly determine whether or not the mobile device is located within the effective area if the reception strength changes due to a way of using the mobile device such as a mobile communication terminal.

The present disclosure has been made in consideration of the foregoing. It is an object of the present disclosure to provide a vehicle control system capable of more strictly determining whether or not a mobile device is located within an effective area in accordance with a way of using the mobile device.

A vehicle control system according to the present disclosure relates to a vehicle control system that includes a mobile device carried by a vehicle user and an onboard device mounted on the vehicle. The onboard device accordingly provides vehicle control preassigned to the vehicle when wireless communication between the mobile device and the onboard device is performed and the onboard device receives an authentication code unique to the vehicle from the mobile device when the mobile device is located within an effective area around a specified vehicular place in the vehicle.

In a vehicle control system according to a first example of the present disclosure, an onboard device includes a vehicle-based transmission portion that wirelessly transmits a specified vehicle signal using an antenna provided at a vehicular place when detecting a predetermined vehicle-based trigger. A mobile device includes a mobile-based reception portion, a strength measurement portion, a strength information storage portion, an area determination portion, and a determination signal transmission portion. The mobile-based reception portion receives a vehicle signal. The strength measurement portion measures reception strength of the vehicle signal received by the mobile-based reception portion. The strength information storage portion identifies a target distance between the mobile device and the vehicular place and stores strength information indicating characteristics of the reception strength corresponding to the target distance. The area determination portion determines whether or not the mobile device is located within the effective area, based on the reception strength measured by the strength measurement portion and the strength information stored in the strength information storage portion. The determination signal transmission portion wirelessly transmits a specified determination signal when the area determination portion determines that the mobile device is located within the effective area. The mobile device further includes a state detection portion, a correction information acquisition portion, and a strength information correction portion. The state detection portion detects a mobile state quantity as at least one of a tilt amount of the mobile device with reference to a gravity direction and a remaining battery level of the mobile device. The correction information acquisition portion acquires correction information indicating characteristics of the reception strength corresponding to the mobile state quantity. The strength information correction portion corrects the strength information stored in the strength information storage portion based on mobile state quantity detected by the state detection portion at a time of receipt of the vehicle signal and the correction information acquired by the correction information acquisition portion.

The vehicle control system is capable of more exactly determining whether or not the mobile device is located within an effective area in accordance with a way of using the mobile device.

In a vehicle control system according to a second example of the present disclosure, a mobile device includes a mobile-based transmission portion. The mobile-based transmission portion wirelessly transmits a specified mobile signal when a predetermined mobile-based trigger is detected. An onboard device includes a vehicle-based reception portion, a strength measurement portion, a strength information storage portion, and an area determination portion. The vehicle-based reception portion receives the mobile signal. The strength measurement portion measures reception strength of the mobile signal received by the vehicle-based reception portion. The strength information storage portion settles a target distance between the mobile device and the vehicular place and stores strength information indicating characteristics of the reception strength corresponding to the target distance. The area determination portion determines whether or not the mobile device is located within the effective area, based on the reception strength measured by the strength measurement portion and the strength information stored in the strength information storage portion. The mobile device further includes a state detection portion and a state information provision portion. The state detection portion detects a mobile state quantity as at least one of a tilt amount of the mobile device with reference to a gravity direction and a remaining battery level of the mobile device. The state information provision portion provides the mobile signal with state information indicating the mobile state quantity detected by the state detection portion at a time of transmission of the mobile signal. The onboard device further includes a correction information acquisition portion and a strength information correction portion. The correction information acquisition portion acquires correction information indicating characteristics of the reception strength corresponding to the mobile state quantity. The strength information correction portion corrects the strength information stored in the strength information storage portion based on the state information received along with the mobile signal via the vehicle-based reception portion and the correction information acquired by the correction information acquisition portion.

The vehicle control system is capable of more exactly determining whether or not the mobile device is located within an effective area in accordance with a way of using the mobile device.

In a vehicle control system according to a third example of the present disclosure, a mobile device includes a mobile-based transmission portion. The mobile-based transmission portion wirelessly transmits a specified mobile signal when a predetermined mobile-based trigger is detected. An onboard device includes a vehicle-based reception portion, a strength measurement portion, a strength information storage portion, and an area determination portion. The vehicle-based reception portion receives the mobile signal. The strength measurement portion measures reception strength of the mobile signal received by the vehicle-based reception portion. The strength information storage portion settles a target distance between the mobile device and the vehicular place and stores strength information indicating characteristics of the reception strength corresponding to the target distance. The area determination portion determines whether or not the mobile device is located within the effective area, based on the reception strength measured by the strength measurement portion and the strength information stored in the strength information storage portion. The mobile device further includes a state detection portion, a correction information acquisition portion, and a transmission output adjustment portion. The state detection portion detects a tilt amount of the mobile device with reference to a gravity direction. The correction information acquisition portion acquires correction information indicating characteristics of the reception strength corresponding to the tilt amount. The transmission output adjustment portion adjusts transmission output of the mobile signal so as to correct the strength information stored in the strength information storage portion based on the tilt amount detected by the state detection portion at a time of transmission of the mobile signal and the correction information acquired by the correction information acquisition portion.

The vehicle control system is capable of more exactly determining whether or not the mobile device is located within an effective area in accordance with a way of using the mobile device.

In a vehicle control system according to a fourth example of the present disclosure, a mobile device includes a vehicle-based reception portion and a vehicle-based transmission portion. The vehicle-based reception portion receives a specified mobile signal. The vehicle-based transmission portion wirelessly transmits a specified vehicle signal via an antenna provided at the vehicular place when the vehicle-based reception portion receives the mobile signal. A mobile device includes a mobile-based transmission portion, a mobile-based reception portion, a strength measurement portion, a strength information storage portion, an area determination portion, and a determination signal transmission portion. The mobile-based transmission portion wirelessly transmits the mobile signal when a predetermined mobile-based trigger is detected. The mobile-based reception portion receives the vehicle signal. The strength measurement portion measures reception strength of the vehicle signal received by the mobile-based reception portion. The strength information storage portion settles a target distance between the mobile device and the vehicular place and stores strength information indicating characteristics of the reception strength corresponding to the target distance. The area determination portion determines whether or not the mobile device is located within the effective area, based on the reception strength measured by the strength measurement portion and the strength information stored in the strength information storage portion. The determination signal transmission portion wirelessly transmits a specified determination signal when the area determination portion determines that the mobile device is located within the effective area. The mobile device further includes a state detection portion and a state information provision portion. The state detection portion detects a remaining battery level of the mobile device. The state information provision portion provides the mobile signal with state information indicating the remaining battery level detected by the state detection portion at a time of transmission of the mobile signal. The onboard device further includes a correction information acquisition portion and a transmission output adjustment portion. The correction information acquisition portion acquires correction information indicating characteristics of the reception strength corresponding to the remaining battery level. The transmission output adjustment portion adjusts transmission output of the vehicle signal so as to correct the strength information stored in the strength information storage portion based on the state information received along with the mobile signal via the vehicle-based reception portion and the correction information acquired by the correction information acquisition portion.

The vehicle control system is capable of more exactly determining whether or not the mobile device is located within an effective area in accordance with a way of using the mobile device.

In a vehicle control system according to a fifth example of the present disclosure, a mobile device includes a mobile-based reception portion, a mobile-based transmission portion, a strength measurement portion, and a reception information provision portion. The mobile-based reception portion receives a specified vehicle signal. The mobile-based transmission portion wirelessly transmits a specified mobile signal when the mobile-based reception portion receives the vehicle signal. The strength measurement portion measures reception strength of the vehicle signal received by the mobile-based reception portion. The reception information provision portion provides the mobile signal with reception information indicating the reception strength measured by the strength measurement portion. An onboard device includes a vehicle-based transmission portion, a vehicle-based reception portion, a strength information storage portion, and an area determination portion. The vehicle-based transmission portion wirelessly transmits the vehicle signal when a predetermined vehicle-based trigger is detected. The vehicle-based reception portion receives the mobile signal. The strength information storage portion settles a target distance between the mobile device and the vehicular place and stores strength information indicating characteristics of the reception strength corresponding to the target distance. The area determination portion determines whether or not the mobile device is located within the effective area, based on the reception information received along with the mobile signal via the vehicle-based reception portion and the strength information stored in the strength information storage portion. The mobile device further includes a state detection portion, a correction information acquisition portion, and a reception information correction portion. The state detection portion detects a mobile state quantity as at least one of a tilt amount of the mobile device with reference to a gravity direction and a remaining battery level of the mobile device. The correction information acquisition portion acquires correction information indicating characteristics of the reception strength corresponding to the mobile state quantity. The reception information correction portion corrects the reception information attached to the mobile signal by the reception information provision portion based on the mobile state quantity detected by the state detection portion at a time of receipt of the vehicle signal and the correction information acquired by the correction information acquisition portion.

The vehicle control system is capable of more exactly determining whether or not the mobile device is located within an effective area in accordance with a way of using the mobile device.

BRIEF DESCRIPTION OF DRAWINGS

The above and other objects, features, and advantages of the present disclosure will be more apparent from the following detailed description with reference to the accompanying drawings in which.

DESCRIPTION OF EMBODIMENTS

Embodiments of the present disclosure will be described with reference to the accompanying drawings.

Basic Configuration of the Vehicle Control System

The following describes a basic configuration of the vehicle control system as an embodiment of the present disclosure.

Figure 1A:
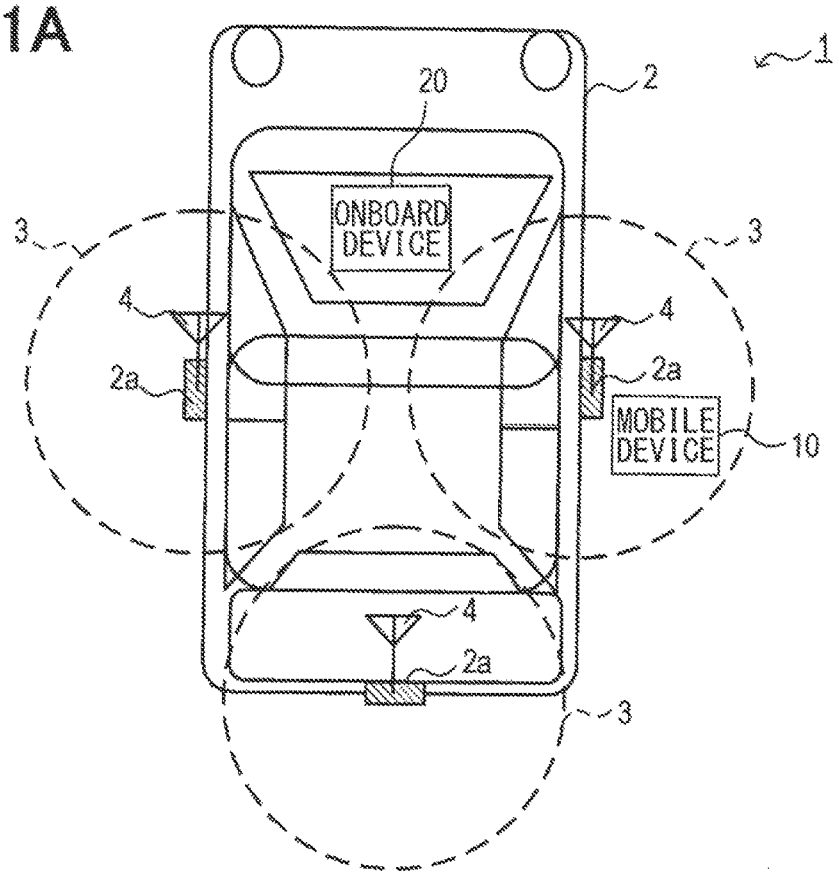
FIG. 1A is a diagram illustrating an example of an effective area for a keyless entry system in a vehicle control system.
Figure 1B:
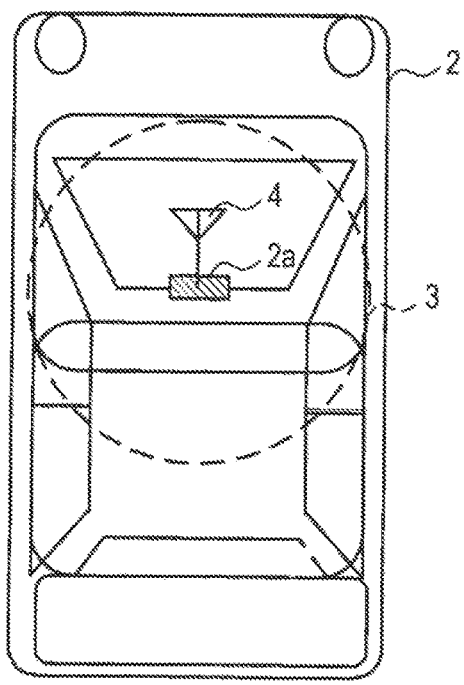
FIG. 1B is a diagram illustrating another example of an effective area for an engine starter system in the vehicle control system.

As illustrated in FIGS. 1A and 1B, a vehicle control system 1 includes a mobile device 10 carried by a user of a vehicle 2 and an onboard device 20 mounted on the vehicle 2. The vehicle control system 1 performs wireless communication between the mobile device 10 and the onboard device 20. The vehicle control system 1 provides vehicle control preassigned to the vehicle 2 when the onboard device 20 receives an authentication code unique to the vehicle from the mobile device 10 located within an effective area 3 around a specified vehicular place 2a in the vehicle 2.

The vehicle control system 1 allows at least one of the mobile device 10 and the onboard device 20 to include a function (hereinafter referred to as an area determination function) that determines whether or not the mobile device 10 is located within the effective area 3. In the following description, a type of allowing the mobile device 10 to include the area determination function is referred to as a mobile-based area determination type. A type of allowing the onboard device 20 to include the area determination function is referred to as a vehicle-based area determination type.

The vehicle control system 1 provides the vehicle control as follows. The area determination function determines that the mobile device 10 is located within the effective area 3. The onboard device 20 confirms, based on an authentication code received from the mobile device 10, that the mobile device 10 is an authenticated key device registered to the onboard device 20. In this case, the onboard device 20 locks or unlocks a door or starts a machine such as an engine in the vehicle 2.

The vehicle control system 1 to lock or unlock a door is comparable to a keyless entry system. As illustrated in FIG. 1A, a vehicular place 2a is provided on a door corresponding to a driver's seat, on a door corresponding to a passenger seat, and near a door handle for a user to open or close a rear trunk. The vehicular place 2a is provided with an antenna 4 to receive a wireless signal transmitted at least from the mobile device 10. The effective area 3 is predetermined to confirm that the user of the vehicle 2 exists near the door corresponding to the driver's seat, the door near the passenger seat, or the rear trunk.

The vehicle control system 1 to start a machine such as an engine is comparable to an engine starter system. As illustrated in FIG. 1B, the vehicular place 2a is provided near the center in the vehicle compartment. The vehicular place 2a is provided with the antenna 4. In this case, the effective area 3 is predetermined to confirm that the user of the vehicle 2 exists in the vehicle compartment.

The effective area 3 is predetermined for a preventive requirement. For example, the keyless entry system prevents a third party from entering the vehicle 2 due to an unlocked door even though the user of the vehicle 2 does not exist near the door. The engine starter system prevents a third party from driving (stealing) the vehicle 2 due to a started engine even though the user of the vehicle 2 does not exist in the vehicle compartment. On the other hand, the effective area 3 is predetermined for a positive requirement of improving usability. The effective area 3 helps to reliably unlock the door or start the engine when the user of the vehicle 2 exists near the door or in the vehicle compartment. For example, a manufacturer of the vehicle 2 strictly predetermines the effective area 3 to satisfy both of the requirements.

For the purpose of illustration, the following describes the keyless entry system as an example of the vehicle control system 1. The vehicular place 2a is defined near the door corresponding to the driver's seat of the vehicle 2. The onboard device 20 provides vehicle control to unlock the door of the vehicle 2. Functions as a key device can be installed in the mobile device 10 including a mobile communication terminal such as a mobile telephone or a smart phone as well as a dedicated key device in the keyless entry system. The vehicle control system 1 uses wireless signals at a specified frequency band compliant with Bluetooth (registered trademark) used for many mobile communication terminals.

Basic Configuration of the Mobile Device

The following describes a basic configuration of the mobile device 10.

Figure 2A:
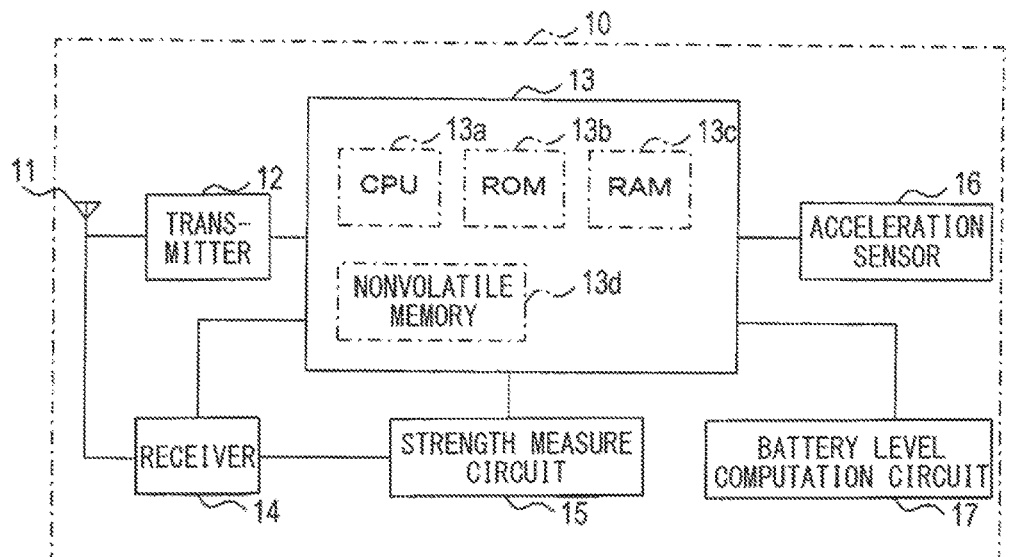
FIG. 2A is a block diagram illustrating a configuration of a mobile device in the vehicle control system.

As illustrated in FIG. 2A, the mobile device 10 includes an antenna 11, a transmission portion 12, a control portion 13, a reception portion 14, an strength measurement circuit 15, an acceleration sensor 16, and a remaining battery level computation circuit 17. The antenna 11 transmits and receives a wireless signal. The transmission portion 12 supplies the antenna 11 with a data signal containing various types of information. The control portion 13 controls the transmission portion 12. The reception portion 14 supplies the control portion 13 with an input signal from the antenna 11. The strength measurement circuit 15 measures the reception strength of a wireless signal received by the reception portion 14. The acceleration sensor 16 detects a tilt amount of the mobile device 10 with reference to the gravity direction. The remaining battery level computation circuit 17 computes a remaining battery level of the mobile device 10.

Though not illustrated, the transmission portion 12 includes an oscillation portion, a modulation portion, and a matching portion. The oscillation portion generates a carrier wave at a specified frequency band. The modulation portion modulates a carrier wave from the oscillation portion to generate a data signal. The matching portion efficiently supplies the antenna 11 with a data signal supplied from the modulation portion. These portions operate on instructions from the control portion 13. For example, the modulation portion modulates a carrier wave based on various types of information specified by the control portion.

Though not illustrated, the reception portion 14 includes a matching portion, a bandpass filter, and a demodulation portion. The matching portion efficiently supplies a reception signal from the antenna 11. The band pass filter allows a signal at a specified frequency band in input signals from the matching portion to pass through to remove an unnecessary input signal. The demodulation portion demodulates a signal at a specified frequency band passing through the bandpass filter. A data signal demodulated by the demodulation portion is input to the control portion 13.

The strength measurement circuit 15 provides an RSSI circuitry to measure the signal strength of a wireless signal as a received signal strength indication (RSSI) so that the demodulation portion of the reception portion 14 sets an amplification rate to appropriately demodulate a signal at specified frequency band.

An RSSI measured by the strength measurement circuit 15 is input to the demodulation portion and the control portion 13.

The control portion 13 is mainly configured as a known microcomputer including a CPU 13a, ROM 13b, RAM 13c, and nonvolatile memory 13d. The CPU 13a uses the RAM 13c as a work area based on a program stored in the ROM 13b or the nonvolatile memory 13d to perform various processes (mobile-based processes) to implement functions of the mobile device 10 in the vehicle control system 1.

Though not illustrated, the control portion 13 includes a waveform shaping portion and a comparator. The waveform shaping portion shapes an input signal from the demodulation portion into a square wave. The comparator converts a signal shaped by the waveform shaping portion into a digital value. The control portion 13 reads various types of information based on a data signal the comparator converts into a digital value.

In the vehicle control system 1 of the mobile-based transmission type, the mobile device 10 includes a switch to detect user's press manipulation on the mobile device as a trigger. In the vehicle control system 1 of the mobile-based area determination type, the nonvolatile memory 13d of the control portion 13 previously stores strength information to be described later. Of the components included in the mobile device 10, the reception portion 14 and the strength measurement circuit 15 may be omitted depending on the type of the vehicle control system 1.

Basic Configuration of the Onboard Device

The following describes the basic configuration of the onboard device 20.

Figure 2B:
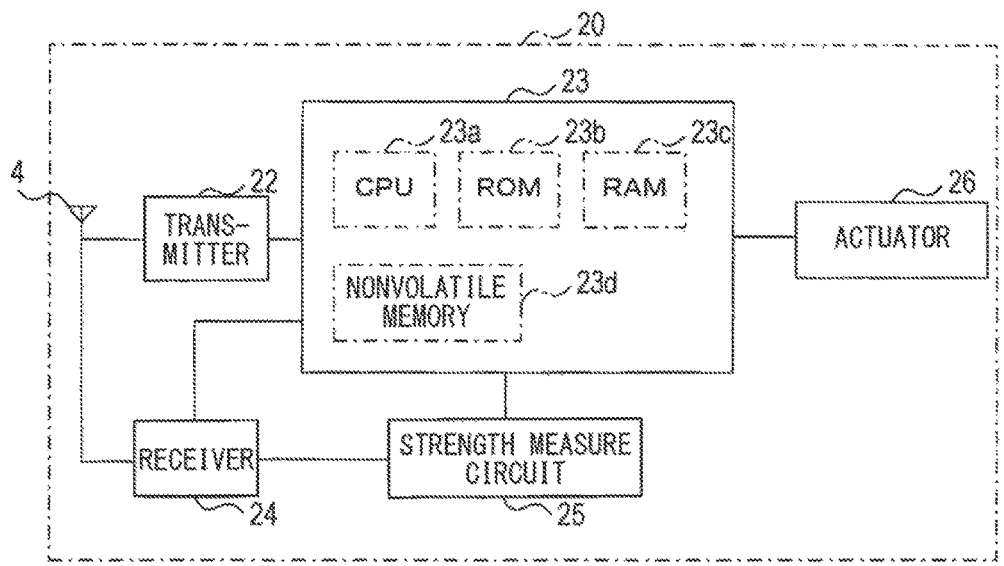
FIG. 2B is a block diagram illustrating a configuration of an onboard device in the vehicle control system.

As illustrated in FIG. 2B, the onboard device 20 includes an antenna 4, a transmission portion 22, a control portion 23, a reception portion 24, a strength measurement circuit 25, and an actuator 26. The antenna 4 transmits and receives a wireless signal. The transmission portion 22 supplies the antenna 4 with a data signal containing various types of information. The control portion 23 controls the transmission portion 22. The reception portion 24 supplies an input signal from the antenna 4 to the control portion 23. The strength measurement circuit 25 measures the reception strength of a wireless signal received from the reception portion 24. The actuator 26 locks or unlocks a door of the vehicle 2.

The transmission portion 22, the control portion 23, the reception portion 24, and the strength measurement circuit 25 comply with the basic configuration of the mobile device 10 and maintain known configurations corresponding to the transmission portion 12, the control portion 13, the reception portion 14, and the strength measurement circuit 15 in the mobile device 10. The description about the transmission portion 22, the control portion 23, the reception portion 24, and the strength measurement circuit 25 is omitted. However, the control portion 23 performs various processes (vehicle-based processes) to implement functions of the onboard device 20 in the vehicle control system 1.

In the vehicle control system 1 of the vehicle-based transmission type, the onboard device 20 includes a sensor to detect user's touch manipulation on a door handle at the driver's seat side as a trigger. In the vehicle control system 1 of the vehicle-based area determination type, nonvolatile memory 23d of the control portion 23 previously stores strength information to be described later. Of the components included in the onboard device 20, the transmission portion 22 and the strength measurement circuit 25 may be omitted depending on the type of the vehicle control system 1.

Strength Information

The following describes the strength information.

Figure 3:
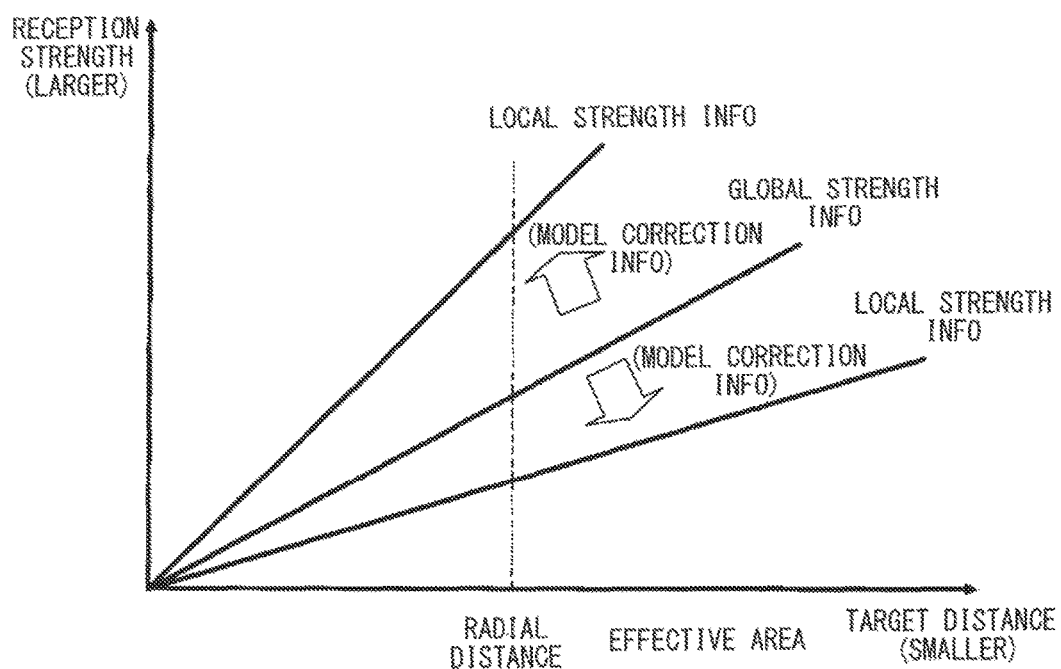
FIG. 3 is a graph illustrating strength information.

As illustrated in FIG. 3, a target distance is defined between the mobile device 10 and the vehicular place 2a. The strength information provides correlation between the target distance and the wireless signal reception strength. For example, the mobile device 10 may measure the wireless signal reception strength. In this case, the wireless signal reception strength signifies the reception strength of a vehicle signal transmitted from the onboard device 20. The onboard device 20 may measure the wireless signal reception strength. In this case, the wireless signal reception strength signifies the reception strength of a mobile signal transmitted from the mobile device 10.

The strength information represents characteristics of the reception strength depending on the target distance. Namely, decreasing the target distance allows the position of the mobile device 10 to approach the vehicular place 2a and increases the reception strength of a wireless signal.

Manufacturers of the vehicle 2 previously compute the strength information using the mobile device 10 as a dedicated key device. The strength information is previously stored in at least one of the ROM 13b and the nonvolatile memory 13d of the mobile device 10 and at least one of the ROM 23b and the nonvolatile memory 23d of the onboard device 20. The strength information previously computed using a dedicated key device is hereinafter referred to as standard strength information.

When a mobile communication terminal is used as the mobile device 10, reception sensitivities of a wireless signal depend on models of the mobile communication terminal. For example, the performance of the reception portion 14 of the mobile device 10 depends on models of the mobile communication terminal when the mobile device 10 measures the reception strength of a vehicle signal. The performance of the transmission portion 12 of the mobile device 10 depends on models of the mobile communication terminal when the onboard device 20 measures the mobile signal reception strength. The mobile communication terminal causes variations in the reception strength and a transmission output.

Since the strength information depends on models of the mobile communication terminal, manufacturers of the vehicle 2 or the mobile communication terminal use the mobile communication terminal corresponding to each model to previously compute the strength information. The strength information is previously stored in at least one of the ROM 13b and the nonvolatile memory 13d of the mobile device 10 and at least one of the ROM 23b and the nonvolatile memory 23d of the onboard device 20. The strength information previously computed using the mobile communication terminal is hereinafter referred to as local strength information.

Correction Information

The following describes the correction information.

The correction information is used to correct the strength information previously stored in at least one of the ROM 13b and the nonvolatile memory 13d of the mobile device 10 and at least one of the ROM 23b and the nonvolatile memory 23d of the onboard device 20.

Specifically, the correction information is used to correct the strength information based on a quantity (hereinafter referred to as mobile state quantity) indicating the state of the mobile device 10 such as the tilt amount or the remaining battery level of the mobile device 10 at least when a wireless signal is transmitted or received. The correction information represents characteristics of the wireless signal reception strength corresponding to the mobile state quantity.

Figure 4A:
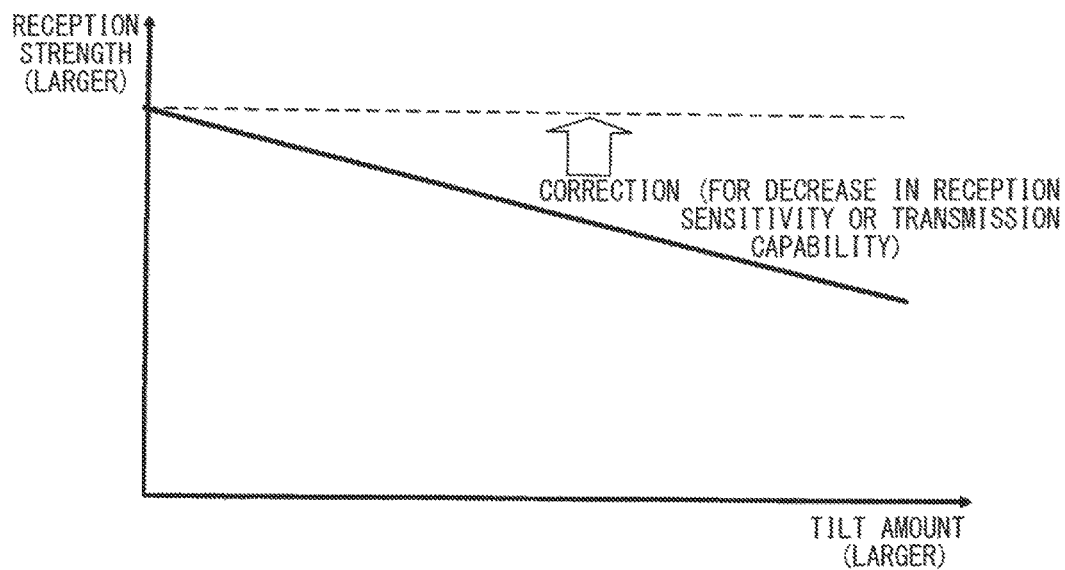
FIG. 4A is a graph illustrating correction information concerning a tilt amount of the mobile device.

As illustrated in FIG. 4A, for example, the wireless signal reception strength depends on the tilt amount (orientation) of the mobile device 10 when transmitting or receiving a wireless signal. The reason follows. Directional characteristics of the antenna 4 for reception vary with the orientation of the mobile device 10 when the mobile device 10 measures the reception strength of a vehicle signal. Directional characteristics of the antenna 4 for transmission vary with the orientation of the mobile device 10 when the onboard device 20 measures the reception strength of a mobile signal. The mobile device 10 causes variations in the reception sensitivity and transmission capacity.

According to the example in FIG. 4A, the reception strength (reception sensitivity or transmission output) is maximized when the mobile device 10 corresponds to the tilt amount set to zero while transmitting or receiving a wireless signal. The reception strength (reception sensitivity or transmission output) decreases as the tilt amount increases. However, the embodiment is not limited to this example. The tilt amount of the mobile device 10 may be used as a parameter with reference to one, two, or three axes in the gravity center direction.

Figure 4B:
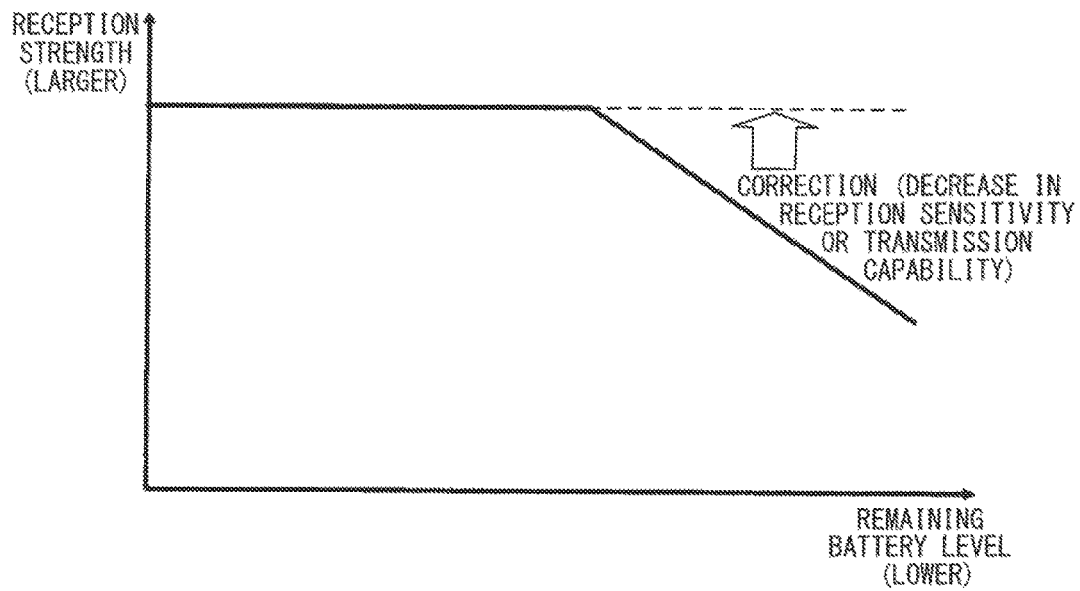
FIG. 4B is a graph illustrating correction information concerning a remaining battery level of the mobile device.

As illustrated in FIG. 4B, for example, the wireless signal reception strength depends on the remaining battery level of the mobile device 10 when transmitting or receiving a wireless signal. The reason follows. Decreasing the remaining battery level also decreases the voltage supplied to the reception portion 14 of the mobile device 10 when the mobile device 10 measures the reception strength of a vehicle signal. Decreasing the remaining battery level also decreases the voltage supplied to the transmission portion 12 of the mobile device 10 when the onboard device 20 measures the reception strength of a mobile signal. The mobile device 10 decreases the reception sensitivity and transmission output.

Manufacturers of the vehicle 2 or the mobile communication terminal previously compute the correction information. The correction information is previously stored in at least one of the ROM 13b and the nonvolatile memory 13d of the mobile device 10 and at least one of the ROM 23b and the nonvolatile memory 23d of the onboard device 20.

As illustrated in FIG. 3B, the correction information in a broad sense may also cover information (hereinafter referred to as model correction information) to correct the standard strength information to the local strength information that depends on models of the mobile device 10.

Working Example 1

The following describes working example 1 of the embodiment based on the basic configuration. The vehicle control system 1 according to working example 1 is assumed to be of mobile-based transmission type and mobile-based area determination type. The ROM 13b or the nonvolatile memory 13d of the mobile device 10 stores the local strength information corresponding to the mobile device 10. The local strength information indicates the correlation between the target distance and the vehicle signal reception strength in the mobile device 10. The ROM 23b or the nonvolatile memory 23d of the onboard device 20 stores several pieces of correction information corresponding to models of the mobile device 10. The correction information is used to correct the reception sensitivity (consequently the vehicle signal reception strength in the mobile device 10) of the mobile device 10. The reception sensitivity depends on the mobile state quantity.

Figure 5:
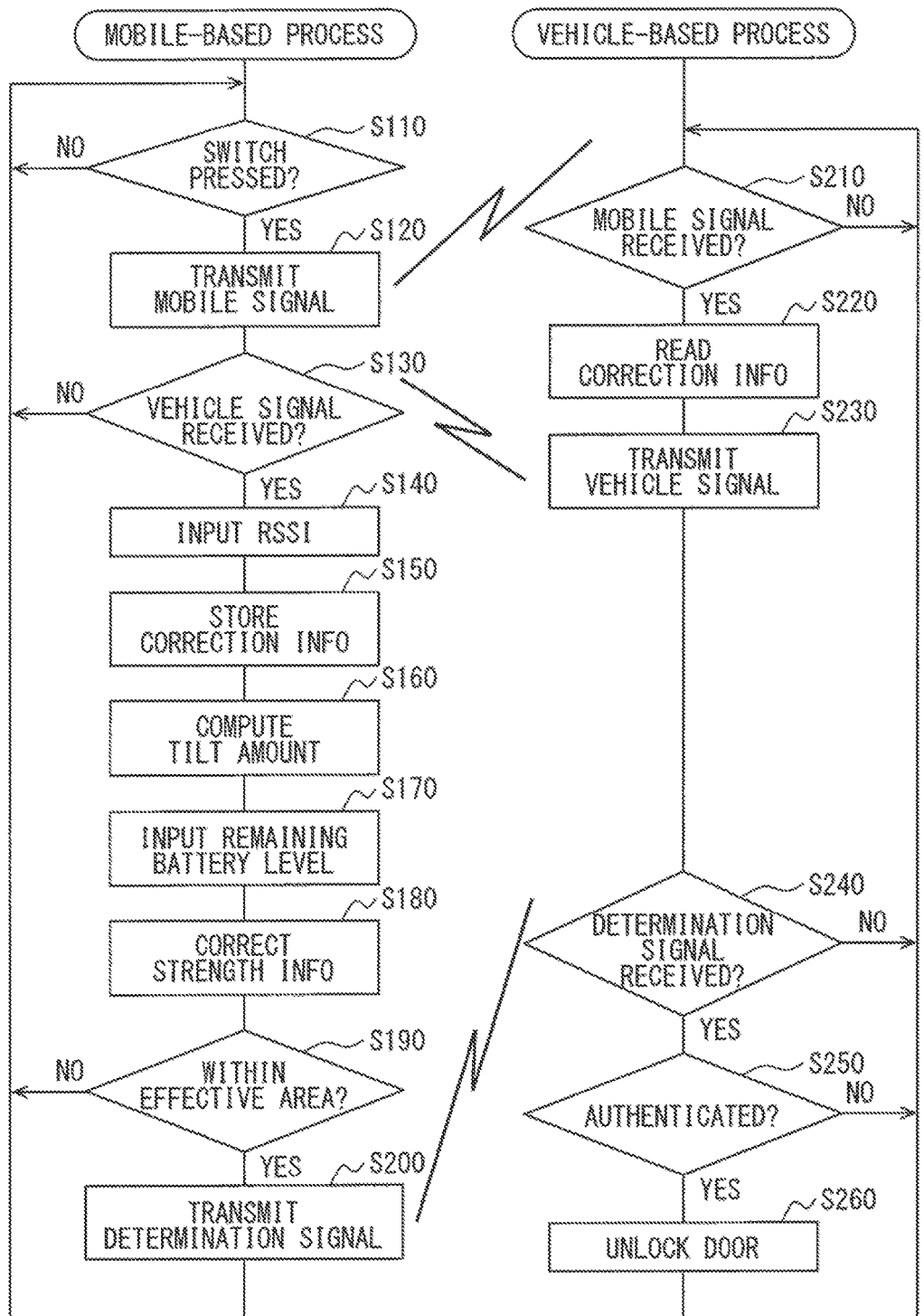
FIG. 5 is a flowchart illustrating an operation of the vehicle control system as example 1.

A flowchart in FIG. 5 is used to describe a mobile-based process performed by the control portion 13 of the mobile device 10 and a vehicle-based process performed by the control portion 23 of the onboard device 20 according to working example 1.

In the mobile-based process, the control portion 13 determines whether or not a user presses a switch provided for the mobile device 10 (S110). The control portion 13 may detect the switch press manipulation as a trigger (S110; YES). In this case, the control portion 13 allows the transmission portion 12 to wirelessly transmit a mobile signal containing an identifier to specify a model of the mobile device 10 (S120). The control portion 13 may not detect the switch press manipulation (S110; NO). In this case, the control portion 13 enters a wait state.

In the vehicle-based process, the control portion 23 determines whether or not the reception portion 24 of the onboard device 20 receives the mobile signal (S210). The control portion 23 may detect reception of the mobile signal as a trigger (S210; YES). In this case, the control portion 23 reads the correction information corresponding to the identifier contained in the mobile signal from the ROM 23b or the nonvolatile memory 23d (S220). The control portion 23 allows the transmission portion 22 to wirelessly transmit a vehicle signal containing the correction information (S230). The control portion 23 may not detect reception of the mobile signal (S210; NO). In this case, the control portion 23 enters a wait state.

In the mobile-based process, the control portion 13 may receive the vehicle signal via the reception portion 14 of the mobile device 10 (S130; YES). In this case, the control portion 13 is supplied with an RSSI for the received vehicle signal from the strength measurement circuit 15 (S140). The control portion 13 allows the RAM 13c to temporarily store the correction information contained in the vehicle signal (S150). The control portion 13 computes the tilt amount of the mobile device 10 based on a detection value of the acceleration sensor 16 when the vehicle signal is received (S160). The control portion 13 is supplied with the remaining battery level of the mobile device 10 from the remaining battery level computation circuit 17 (S170). The control portion 13 corrects the strength information stored in the ROM 13b or the nonvolatile memory 13d based on the detected mobile state quantity (tilt amount and remaining battery level) and the correction information temporarily stored in the RAM 13c (S180). Based on the corrected strength information and the vehicle signal RSSI, the control portion 13 determines whether or not the target distance corresponding to the vehicle signal reception strength is smaller than or equal to the radial distance of an effective area, namely, whether or not the mobile device 10 is located within the effective area (S190). The control portion 13 may determine that the mobile device 10 is located within the effective area (S190; YES). In this case, the control portion 13 allows the transmission portion 12 to wirelessly transmit a determination signal indicating the result along with a specified authentication code (S200) and returns to S110. The control portion 13 may determine that the mobile device 10 is located outside the effective area (S190; NO). In this case, the control portion 13 returns to S110 without transmitting a determination signal.

Finally, in the vehicle-based process, the control portion 23 determines whether or not the reception portion 24 of the onboard device 20 receives the determination signal (S240). The control portion 23 may receive the determination signal (S240; YES). In this case, based on the authentication code contained in the determination signal, the control portion 23 determines whether or not the mobile device 10 is authenticated (S250). The control portion 23 may determine that the mobile device 10 is authenticated (S250; YES). In this case, the control portion 23 allows the actuator 26 to unlock a door of the vehicle 2 (S260) and returns to S210. The control portion 23 may determine that the determination signal is not received over a specified time period (S240; NO). Alternatively, the control portion 23 may not authenticate the mobile device 10 (S250; NO). In this case, the control portion 23 returns to S210 without unlocking the door of the vehicle 2.

In the vehicle control system 1 according to working example 1, the mobile device 10 performs the area determination based on the reception strength of a wireless signal (vehicle signal) transmitted from the onboard device 20. The mobile device 10 uses a wireless signal (determination signal) to notify the onboard device 20 that the mobile device 10 is located within the effective area if this is the case.

When performing the area determination, the mobile device 10 corrects the vehicle signal reception strength correspondingly to a decrease in the reception sensitivity of the mobile device 10. The reception sensitivity depends on a way of using the mobile device 10 such as the orientation (tilt amount) or the remaining battery level when the vehicle signal is received.

The vehicle control system 1 according to working example 1 can more accurately determine whether or not the mobile device 10 is located within the effective area in accordance with a way of using the mobile device 10.

In working example 1, the control portion 23 to perform the process at S230 exemplifies a vehicle-based transmission portion and a vehicle-based transmission means. The control portion 13 to perform the process at S130 exemplifies a mobile-based reception portion and a mobile-based reception means. The control portion 13 to perform the process at S140 exemplifies a strength measurement portion and a strength measurement means. The ROM 13b or the nonvolatile memory 13d exemplifies a strength information storage portion and a strength information storage means. The control portion 13 to perform the process at S190 exemplifies an area determination portion and an area determination means. The control portion 13 to perform the process at S200 exemplifies a determination signal transmission portion and a determination signal transmission means. The acceleration sensor 16 and the remaining battery level computation circuit 17 exemplify a state detection portion and a state detection means. The control portion 13 to perform the process at S150 exemplifies a correction information acquisition portion and a correction information acquisition means. The control portion 13 to perform the process at S180 exemplifies a strength information correction portion and a strength information correction means.

Modification 1

The following describes a modification of the working example 1.

In the vehicle control system 1 according to working example 1, the onboard device 20 stores the correction information. Instead, the mobile device 10 may store the correction information. The onboard device 20 need not store the correction information predetermined for each model of the mobile device 10. This enables to save a storage area of the onboard device 20 and appropriately correct the reception strength of a mobile signal transmitted from various types of the mobile device 10.

In the vehicle control system 1 according to working example 1, the mobile device 10 may acquire environment information indicating the presence or absence of rain and environment correction information indicating characteristics of the reception strength corresponding to the presence or absence of rain. Based on these pieces of information, the mobile device 10 may correct the strength information (consequently the vehicle signal reception strength).

In this case, the mobile device 10 or the onboard device 20 may store the environment correction information. The environment information may correspond to a detection value from a rain sensor provided for the vehicle 2 or information supplied from the onboard device 20. The environment information may be based on weather information. In this case, a mobile communication terminal as the mobile device 10 acquires the weather information at the current position via the Internet.

Working Example 2

The following describes working example 2 of the embodiment. The vehicle control system 1 according to working example 2 is assumed to be of vehicle-based transmission type and vehicle-based area determination type. The ROM 23b or the nonvolatile memory 23d of the onboard device 20 stores the standard strength information corresponding to the mobile device 10. The standard strength information indicates the correlation between the target distance and the mobile signal reception strength in the onboard device 20. The ROM 13b or the nonvolatile memory 13d of the mobile device 10 stores the correction information (including the model correction information) corresponding to a model of the mobile device 10. The correction information is used to correct the transmission capacity and transmission output (consequently the mobile signal reception strength in the onboard device 20) of the mobile device 10. The transmission capacity and the transmission output depend on the mobile state quantity.

Figure 6:
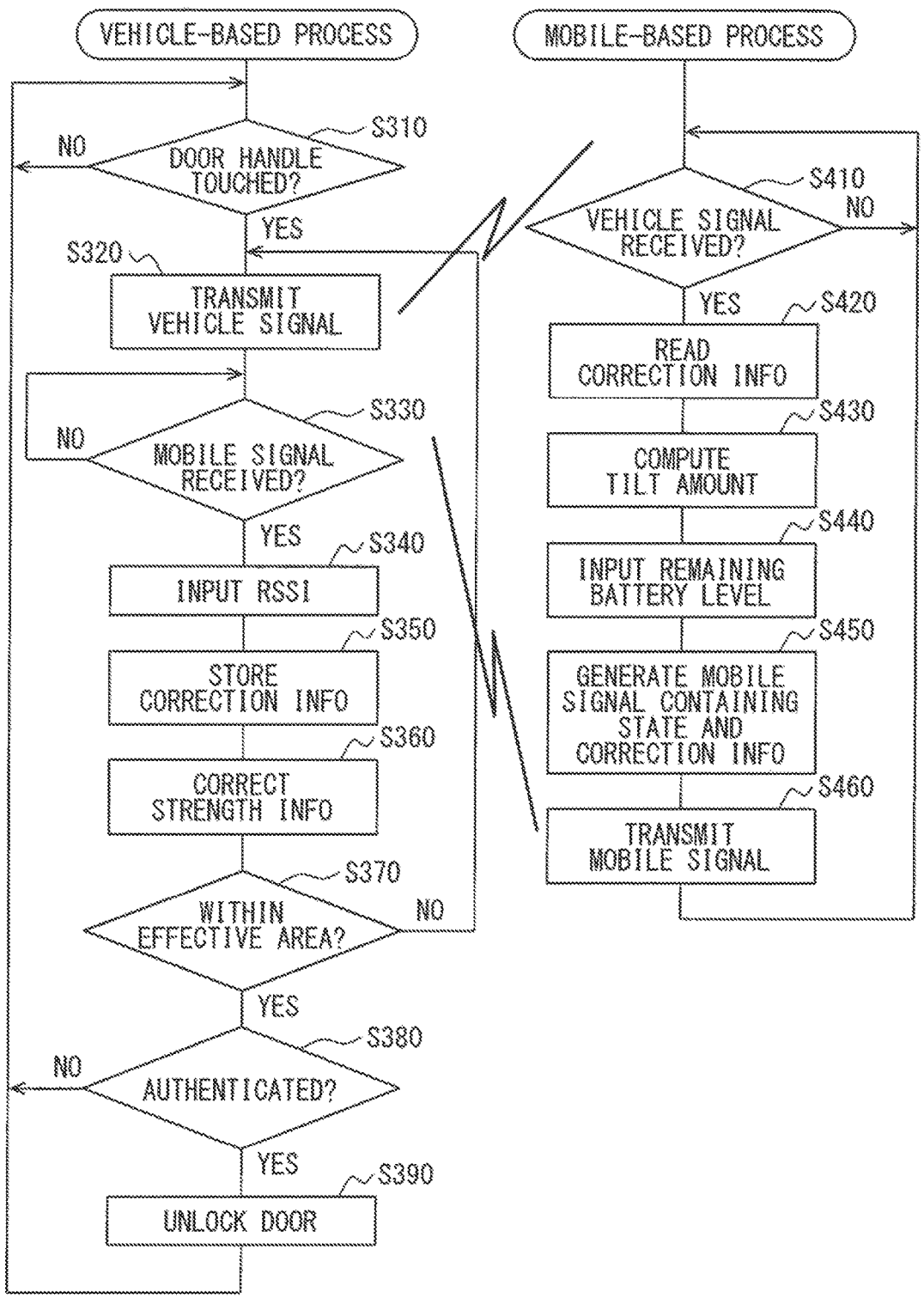
FIG. 6 is a flowchart illustrating an operation of the vehicle control system as example 2.

A flowchart in FIG. 6 is used to describe a mobile-based process performed by the control portion 13 of the mobile device 10 and a vehicle-based process performed by the control portion 23 of the onboard device 20 according to working example 2.

In the vehicle-based process, the control portion 23 determines, based on a detection signal from a sensor provided for the vehicle 2, whether or not a user touches the door handle at the driver's seat (S310). The control portion 23 may detect the touch manipulation on the door handle as a trigger (S310; YES). In this case, the control portion 23 allows the transmission portion 22 to wirelessly transmit a vehicle signal indicating a transmission request to the mobile device 10 (S320). The control portion 23 may not detect the touch manipulation on the door handle (S310; NO). In this case, the control portion 23 enters a wait state.

In the mobile-based process, the control portion 13 allows the reception portion 14 of the mobile device 10 to receive the vehicle signal (S410). The control portion 13 reads the correction information (including the model correction information) corresponding to the model of the mobile device 10 from the ROM 13b or the nonvolatile memory 13d (S420). The control portion 13 computes the tilt amount of the mobile device 10 based on a detection value from the acceleration sensor 16 (S430). The control portion 13 is supplied with the remaining battery level of the mobile device 10 from the remaining battery level computation circuit 17 (S440). The control portion 13 generates a mobile signal (S450). The mobile signal contains state information indicating the detected mobile state quantity (tilt amount and remaining battery level) and the correction information (including the model correction information) read from the ROM 13b or the nonvolatile memory 13d. The control portion 13 allows the transmission portion 12 to wirelessly transmit the generated mobile signal along with a specified authentication code (S460) and returns to S410. The control portion 13 may not detect reception of a vehicle signal (S410; NO). In this case, the control portion 13 enters a wait state.

Finally, in the vehicle-based process, the control portion 23 determines whether or not the reception portion 24 of the onboard device 20 receives the mobile signal (S330). If receiving the mobile signal (S330; YES), the control portion 23 is supplied with RSSI of the received mobile signal from the strength measurement circuit 25 (S340). The control portion 23 temporarily stores the state information and the correction information (including the model correction information) contained in the mobile signal in the RAM 13c (S350). The control portion 23 corrects the strength information stored in the ROM 23b or the nonvolatile memory 23d based on the mobile state quantity (tilt amount and remaining battery level) indicated by the state information and the correction information (including the model correction information) temporarily stored in the RAM 13c (S360). If not detecting reception of the mobile signal (S330; NO), the control portion 23 enters a wait state.

Based on the corrected strength information and RSSI of the mobile signal, the control portion 23 determines whether or not the target distance corresponding to the mobile signal reception strength is smaller than or equal to the radial distance of an effective area, namely, whether or not the mobile device 10 is located within the effective area (S370). The control portion 23 may determine that the mobile device 10 is located within the effective area (S370; YES). In this case, based on the authentication code received along with the mobile signal, the control portion 23 determines whether or not the mobile device 10 is authenticated (S380). The control portion 23 may determine that the mobile device 10 is located outside the effective area (S370; NO). In this case, the control portion 23 returns to S320 without performing the determination based on the authentication code.

The control portion 23 may determine that the mobile device 10 is authenticated (S380; YES). In this case, the control portion 23 allows the actuator 26 to unlock a door of the vehicle 2 (S390) and returns to S310. The control portion 23 may not authenticate the mobile device 10 (S380; NO). In this case, the control portion 23 returns to S310 without unlocking the door of the vehicle 2.

In the vehicle control system 1 according to working example 2, the onboard device 20 performs area determination based on the reception strength of a wireless signal (mobile signal) transmitted from the mobile device 10.

When performing the area determination, the onboard device 20 corrects the mobile signal reception strength in accordance with a decrease in the transmission capacity and transmission output of the mobile device 10. The transmission capacity and the transmission output of the mobile device 10 depend on a way of using the mobile device 10 such as the orientation (tilt amount) or the remaining battery level of the mobile device 10 when the mobile signal is transmitted.

The vehicle control system 1 according to working example 2 can more accurately determine whether or not the mobile device 10 is located within the effective area in accordance with a way of using the mobile device 10.

In working example 2, the control portion 13 to perform the process at S460 exemplifies the mobile-based transmission portion and the mobile-based transmission means. The control portion 23 to perform the process at S330 exemplifies the vehicle-based reception portion and a vehicle-based reception means. The control portion 13 to perform the process at S340 exemplifies the strength measurement portion and the strength measurement means. The ROM 23b or the nonvolatile memory 23d exemplifies a strength information storage portion and a strength information storage means. The control portion 23 to perform the process at S370 exemplifies an area determination portion and an area determination means. The acceleration sensor 16 and the remaining battery level computation circuit 17 exemplify a state detection portion and a state detection means. The control portion 23 to perform the process at S450 exemplifies a state information provision portion and a state information provision means. The control portion 23 to perform the process at S350 exemplifies a correction information acquisition portion and a correction information acquisition means. The control portion 23 to perform the process at S360 exemplifies a strength information correction portion and a strength information correction means.

Modification 2

The following describes a modification of the working example 2.

In the vehicle control system 1 according to working example 2, the mobile device 10 stores the correction information. Instead, the onboard device 20 may store the correction information.

In the vehicle control system 1 according to working example 2, the onboard device 20 may acquire environment information indicating the presence or absence of rain and environment correction information indicating characteristics of the reception strength corresponding to the presence or absence of rain. Based on these pieces of information, the onboard device 20 may correct the strength information (consequently the mobile signal reception strength).

Working Example 3

The following describes working example 3 of the embodiment. The vehicle control system 1 according to working example 3 is assumed to be of vehicle-based transmission type and vehicle-based area determination type. The ROM 23b or the nonvolatile memory 23d of the onboard device 20 stores the local strength information corresponding to the mobile device 10. The local strength information indicates the correlation between the target distance and the mobile signal reception strength in the onboard device 20. The ROM 13b or the nonvolatile memory 13d of the mobile device 10 stores the correction information corresponding to the model of the mobile device 10. The correction information is used to correct the transmission capacity (consequently the mobile signal reception strength in the onboard device 20) of the mobile device 10. The transmission capacity of the mobile device 10 depends on the tilt amount.

Figure 7:
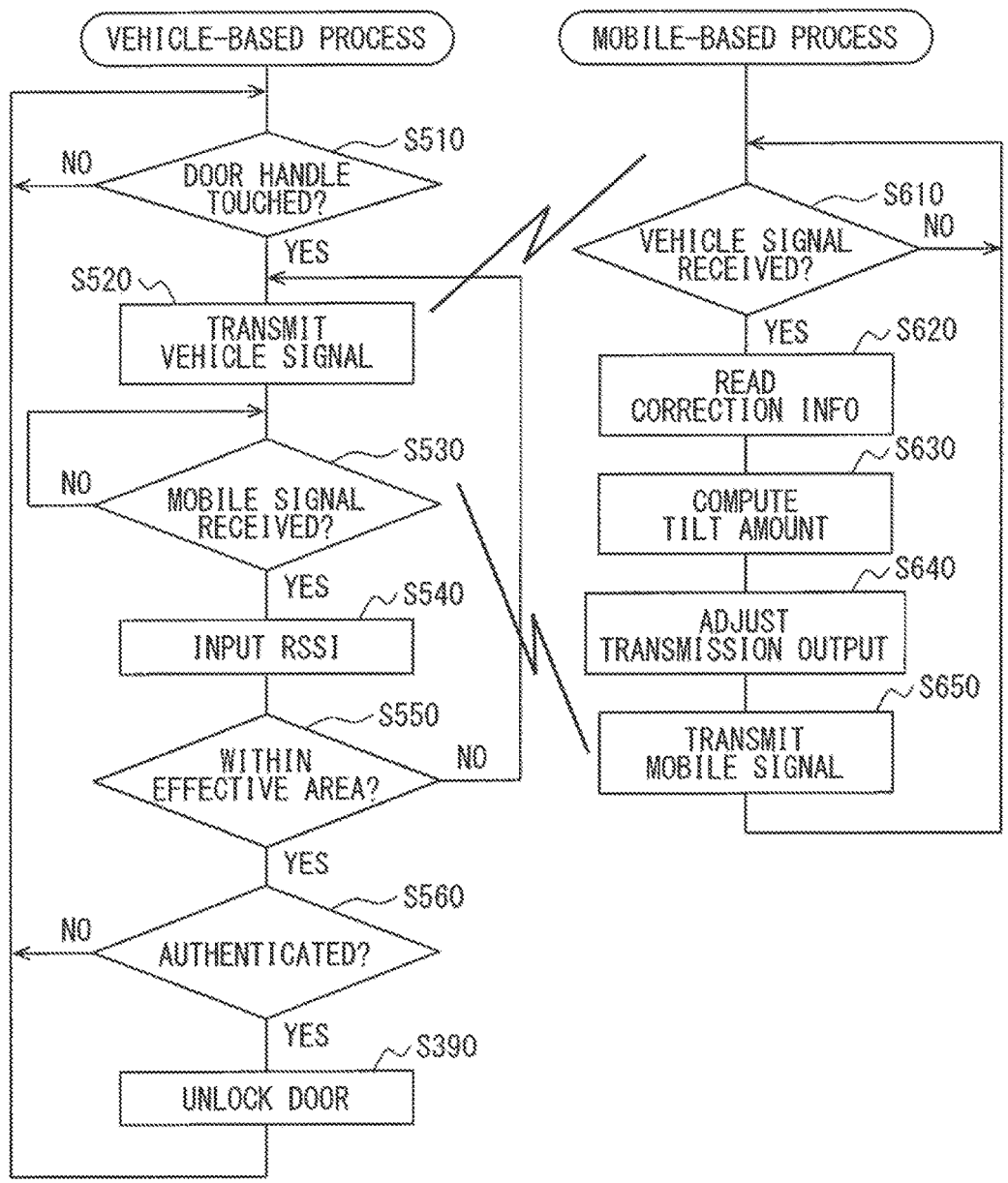
FIG. 7 is a flowchart illustrating an operation of the vehicle control system as example 3.

A flowchart in FIG. 7 is used to describe a mobile-based process performed by the control portion 13 of the mobile device 10 and a vehicle-based process performed by the control portion 23 of the onboard device 20 according to working example 2.

In the vehicle-based process, the control portion 23 determines, based on a detection signal from a sensor provided for the vehicle 2, whether or not a user touches the door handle at the driver's seat (S510). The control portion 23 may detect the touch manipulation on the door handle as a trigger (S510; YES). In this case, the control portion 23 allows the transmission portion 22 to wirelessly transmit a vehicle signal indicating a transmission request to the mobile device 10 (S520). The control portion 23 may not detect the touch manipulation on the door handle (S510; NO). In this case, the control portion 23 enters a wait state.

In the mobile-based process, the control portion 13 allows the reception portion 14 of the mobile device 10 to receive the vehicle signal (S610). The control portion 13 reads the correction information (including the model correction information) corresponding to the model of the mobile device 10 from the ROM 13b or the nonvolatile memory 13d (S620). The control portion 13 computes the tilt amount of the mobile device 10 based on a detection value from the acceleration sensor 16 (S630). The control portion 13 adjusts an wireless signal transmission output from the transmission portion 12 based on the detected tilt amount and the correction information read from the ROM 13b or the nonvolatile memory 13d so as to compensate a decrease in the transmission capacity of the mobile device 10 (S640). The control portion 13 allows the transmission portion 12 to wirelessly transmit a mobile signal containing a specified authentication code (S650) and returns to S610. The control portion 13 may not detect reception of a vehicle signal (S610; NO). In this case, the control portion 13 enters a wait state.

Finally, in the vehicle-based process, the control portion 23 determines whether or not the reception portion 24 of the onboard device 20 receives the mobile signal (S530). If receiving the mobile signal (S530; YES), the control portion 23 is supplied with RSSI of the received mobile signal from the strength measurement circuit 25 (S540). Based on the strength information stored in the ROM 23b or the nonvolatile memory 23d and RSSI of the mobile signal, the control portion 23 determines whether or not the target distance corresponding to the mobile signal reception strength is smaller than or equal to the radial distance of an effective area, namely, whether or not the mobile device 10 is located within the effective area (S550). The control portion 23 may determine that the mobile device 10 is located within the effective area (S550; YES). In this case, based on the authentication code contained in the mobile signal, the control portion 23 determines whether or not the mobile device 10 is authenticated (S560). The control portion 23 may determine that the mobile device 10 is located outside the effective area (S550; NO). In this case, the control portion 23 returns to S520 without performing the determination based on the authentication code.

The control portion 23 may determine that the mobile device 10 is authenticated (S550; YES). In this case, the control portion 23 allows the actuator 26 to unlock a door of the vehicle 2 (S560) and returns to S510. The control portion 23 may not authenticate the mobile device 10 (S550; NO). In this case, the control portion 23 returns to S510 without unlocking the door of the vehicle 2.

In the vehicle control system 1 according to working example 3, the onboard device 20 performs area determination based on the reception strength of a wireless signal (mobile signal) transmitted from the mobile device 10.

The onboard device 20 corrects a mobile signal transmission output in accordance with a decrease in the transmission capacity of the mobile device 10. The transmission capacity of the mobile device 10 depends on the orientation (tilt amount) of the mobile device 10 when transmitting the mobile signal.

The vehicle control system 1 according to working example 3 can more accurately determine whether or not the mobile device 10 is located within the effective area in accordance with a way of using the mobile device 10.

In working example 3, the control portion 13 to perform the process at S650 exemplifies a mobile-based transmission portion and a mobile-based transmission means. The control portion 23 to perform the process at S530 exemplifies the vehicle-based reception portion and the vehicle-based reception means. The ROM 23b or the nonvolatile memory 23d exemplifies the strength information storage portion and the strength information storage means. The control portion 23 to perform the process at S540 exemplifies the strength measurement portion and the strength measurement means. The control portion 23 to perform the process at S550 exemplifies the area determination portion and the area determination means. The acceleration sensor 16 exemplifies the state detection portion and the state detection means. The control portion 13 to perform the process at S620 exemplifies the correction information acquisition portion and the correction information acquisition means. The control portion 13 to perform the process at S640 exemplifies a transmission output adjustment portion and a transmission output adjustment means.

Modification 3

The following describes a modification of the working example 3.

In the vehicle control system 1 according to working example 3, the mobile device 10 stores the correction information. Instead, the onboard device 20 may store the correction information. In this case, for example, the onboard device 20 wirelessly transmits a transmission request to the mobile device 10 before receiving a mobile signal. The mobile device 10 receives the transmission request and transmits a response signal. The onboard device 20 transmits the correction information corresponding to the response signal to the mobile device 10. This enables to efficiently exchange the information.

In the vehicle control system 1 according to working example 3, the onboard device 20 may acquire environment information indicating the presence or absence of rain and environment correction information indicating characteristics of the reception strength corresponding to the presence or absence of rain. Based on these pieces of information, the onboard device 20 may correct the strength information (consequently the mobile signal reception strength).

Working Example 4

The following describes working example 4 of the embodiment. The vehicle control system 1 according to working example 4 is assumed to be of mobile-based transmission type and mobile-based area determination type. The ROM 13b or the nonvolatile memory 13d of the mobile device 10 stores the local strength information corresponding to the mobile device 10. The local strength information indicates the correlation between the target distance and the vehicle signal reception strength in the mobile device 10. The ROM 13b or the nonvolatile memory 13d of the mobile device 10 stores the correction information corresponding to the model of the mobile device 10. The correction information is used to correct the transmission capacity and transmission output (consequently the mobile signal reception strength in the onboard device 20) of the mobile device 10. The transmission capacity and the transmission output of the mobile device 10 depend on the remaining battery level.

Figure 8:
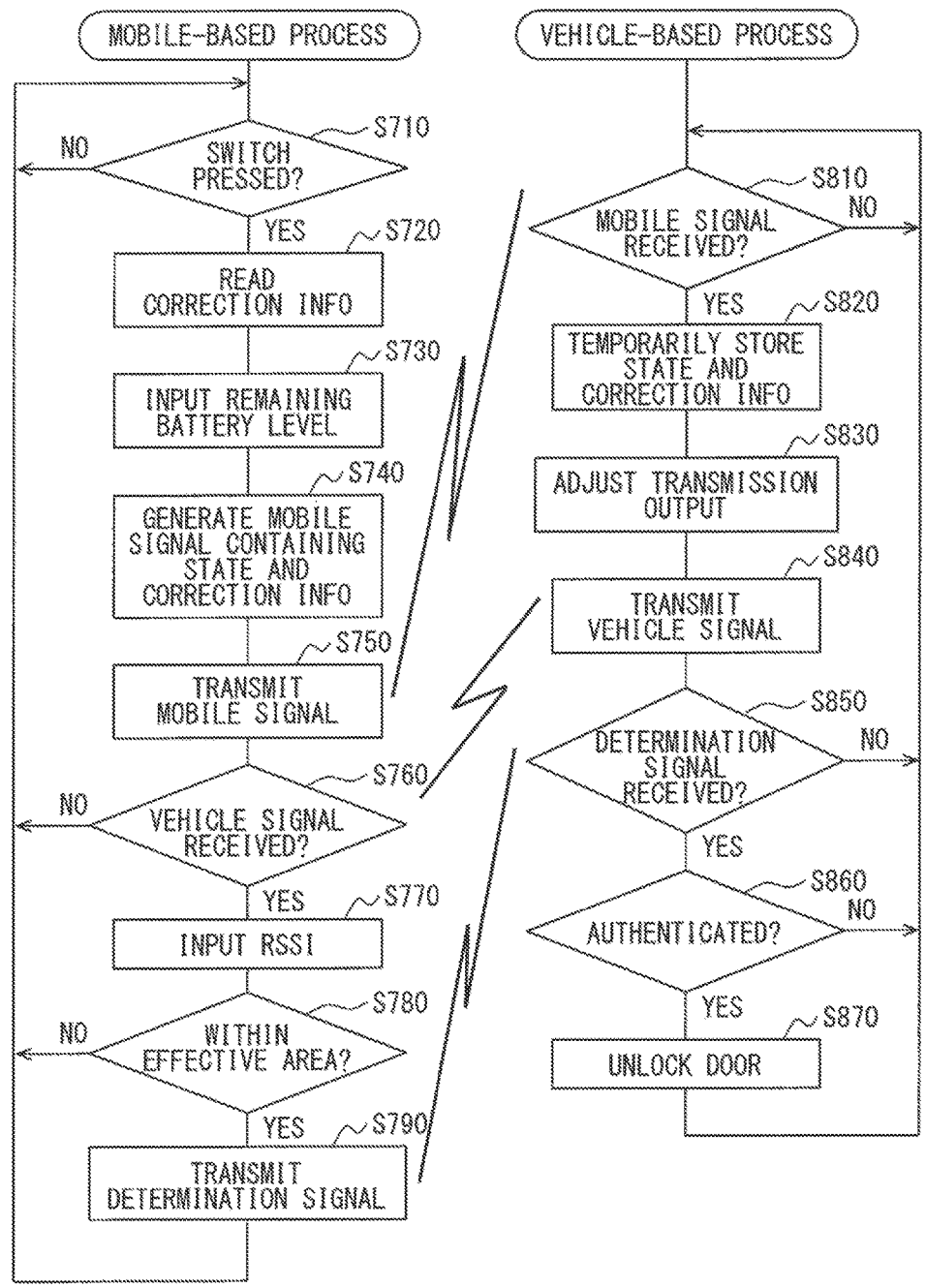
FIG. 8 is a flowchart illustrating an operation of the vehicle control system as example 4.

A flowchart in FIG. 8 is used to describe a mobile-based process performed by the control portion 13 of the mobile device 10 and a vehicle-based process performed by the control portion 23 of the onboard device 20 according to working example 1.

In the mobile-based process, the control portion 13 determines whether or not a user presses a switch provided for the mobile device 10 (S710). The control portion 13 may detect the switch press manipulation as a trigger (S710; YES). In this case, the control portion 13 reads the correction information (including the model correction information) corresponding to the model of the mobile device 10 from the ROM 13b or the nonvolatile memory 13d (S720). The control portion 13 is supplied with the remaining battery level of the mobile device 10 from the remaining battery level computation circuit 17 (S730). The control portion 13 generates a mobile signal containing the state information indicating the detected remaining battery level and the correction information (including the model correction information) read from the ROM 13b or the nonvolatile memory 13d (S740). The control portion 13 allows the transmission portion 12 to wirelessly transmit the generated mobile signal (S750). The control portion 13 may not detect the switch press manipulation (S710; NO). In this case, the control portion 13 enters a wait state.

In the vehicle-based process, the control portion 23 determines whether or not the reception portion 24 of the onboard device 20 receives the mobile signal (S810). The control portion 23 may detect reception of the mobile signal as a trigger (S810; YES). In this case, the control portion 23 temporarily stores the state information (remaining battery level) and the correction information attached to the mobile signal in the RAM 13c (S820). The control portion 23 adjusts an wireless signal transmission output from the transmission portion 22 based on the state information and the correction information stored in the RAM 13c so as to compensate a decrease in the reception sensitivity of the mobile device 10 (S830). The control portion 23 allows the transmission portion 22 to wirelessly transmit a specified vehicle signal (S840). The control portion 23 may not detect reception of a mobile signal (S810; NO). In this case, the control portion 23 enters a wait state.

In the mobile-based process, the control portion 13 determines whether or not the reception portion 14 of the mobile device 10 receives the vehicle signal (S760). If receiving the vehicle signal (S760; YES), the control portion 13 is supplied with RSSI of the received vehicle signal from the strength measurement circuit 15 (S770). Based on the strength information stored in the ROM 13b or the nonvolatile memory 13d and RSSI of the vehicle signal, the control portion 13 determines whether or not the target distance corresponding to the vehicle signal reception strength is smaller than or equal to the radial distance of an effective area, namely, whether or not the mobile device 10 is located within the effective area (S780). The control portion 13 may determine that the mobile device 10 is located within the effective area (S780; YES). In this case, the control portion 13 allows the transmission portion 12 to wirelessly transmit a determination signal indicating the result along with a specified authentication code (S790) and returns to S710. The control portion 13 may determine that the mobile device 10 is located outside the effective area (S780; NO). In this case, the control portion 13 returns to S710 without transmitting a determination signal.

Finally, in the vehicle-based process, the control portion 23 determines whether or not the reception portion 24 of the onboard device 20 receives the determination signal (S850). If receiving the determination signal (S850; YES), the control portion 23 determines, based on the authentication code contained in the determination signal, whether or not the mobile device 10 is authenticated (S860). If successfully authenticating the mobile device 10 (S860; YES), the control portion 23 allows the actuator 26 to unlock a door of the vehicle 2 (S870) and returns to S810. The control portion 23 may determine that no determination signal is received for a specified time period or longer (S850; NO) or that the mobile device 10 cannot be authenticated (S860; NO). In such a case, the control portion 23 returns to S810 without unlocking the door of the vehicle 2.

In the vehicle control system 1 according to working example 4, the mobile device 10 performs the area determination based on the reception strength of a wireless signal (vehicle signal) transmitted from the onboard device 20. The mobile device 10 uses a wireless signal (determination signal) to notify the onboard device 20 that the mobile device 10 is located within the effective area if this is the case.

The onboard device 20 adjusts a vehicle signal transmission output correspondingly to a decrease in the reception sensitivity of the mobile device 10. The reception sensitivity depends on the remaining battery level of the mobile device 10 when the mobile signal is transmitted.

The vehicle control system 1 according to working example 4 can more accurately determine whether or not the mobile device 10 is located within the effective area in accordance with a way of using the mobile device 10.

In working example 3, the control portion 23 to perform the process at S810 exemplifies a vehicle-based reception portion and the vehicle-based reception means. The control portion 23 to perform the process at S840 exemplifies the vehicle-based transmission portion and the vehicle-based transmission means. The control portion 13 to perform the process at S750 exemplifies the mobile-based transmission portion and the mobile-based transmission means. The control portion 13 to perform the process at S760 exemplifies the mobile-based reception portion and the mobile-based reception means. The control portion 13 to perform the process at S770 exemplifies the strength measurement portion and the strength measurement means. The ROM 13b or the nonvolatile memory 13d exemplifies the strength information storage portion and the strength information storage means. The control portion 13 to perform the process at S780 exemplifies the area determination portion and the area determination means. The control portion 13 to perform the process at S790 exemplifies the determination signal transmission portion and the determination signal transmission means. The remaining battery level computation circuit 17 exemplifies the state detection portion and the state detection means. The control portion 13 to perform the process at S740 exemplifies the state information provision portion and the state information provision means. The control portion 23 to perform the process at S820 exemplifies the correction information acquisition portion and the correction information acquisition means. The control portion 23 to perform the process at S830 exemplifies the transmission output adjustment portion and the transmission output adjustment means.

Modification 4

The following describes a modification of the working example 4.

In the vehicle control system 1 according to working example 4, the mobile device 10 stores the correction information. Instead, the onboard device 20 may store the correction information.

In the vehicle control system 1 according to working example 4, the mobile device 10 may acquire environment information indicating the presence or absence of rain and environment correction information indicating characteristics of the reception strength corresponding to the presence or absence of rain. Based on these pieces of information, the mobile device 10 may correct the strength information (consequently the vehicle signal reception strength).

Working Example 5

The following describes working example 5 of the embodiment. The vehicle control system 1 according to working example 5 is assumed to be of vehicle-based transmission type and vehicle-based area determination type. The ROM 23b or the nonvolatile memory 23d of the onboard device 20 stores local standard strength information corresponding to the mobile device 10. The local strength information indicates the correlation between the target distance and the mobile signal reception strength in the onboard device 20. The ROM 13b or the nonvolatile memory 13d of the mobile device 10 stores the correction information corresponding to a model of the mobile device 10. The correction information is used to correct the reception sensitivity (consequently the vehicle signal reception strength in the mobile device 10) of the mobile device 10. The reception sensitivity depends on the mobile state quantity.

Figure 9:
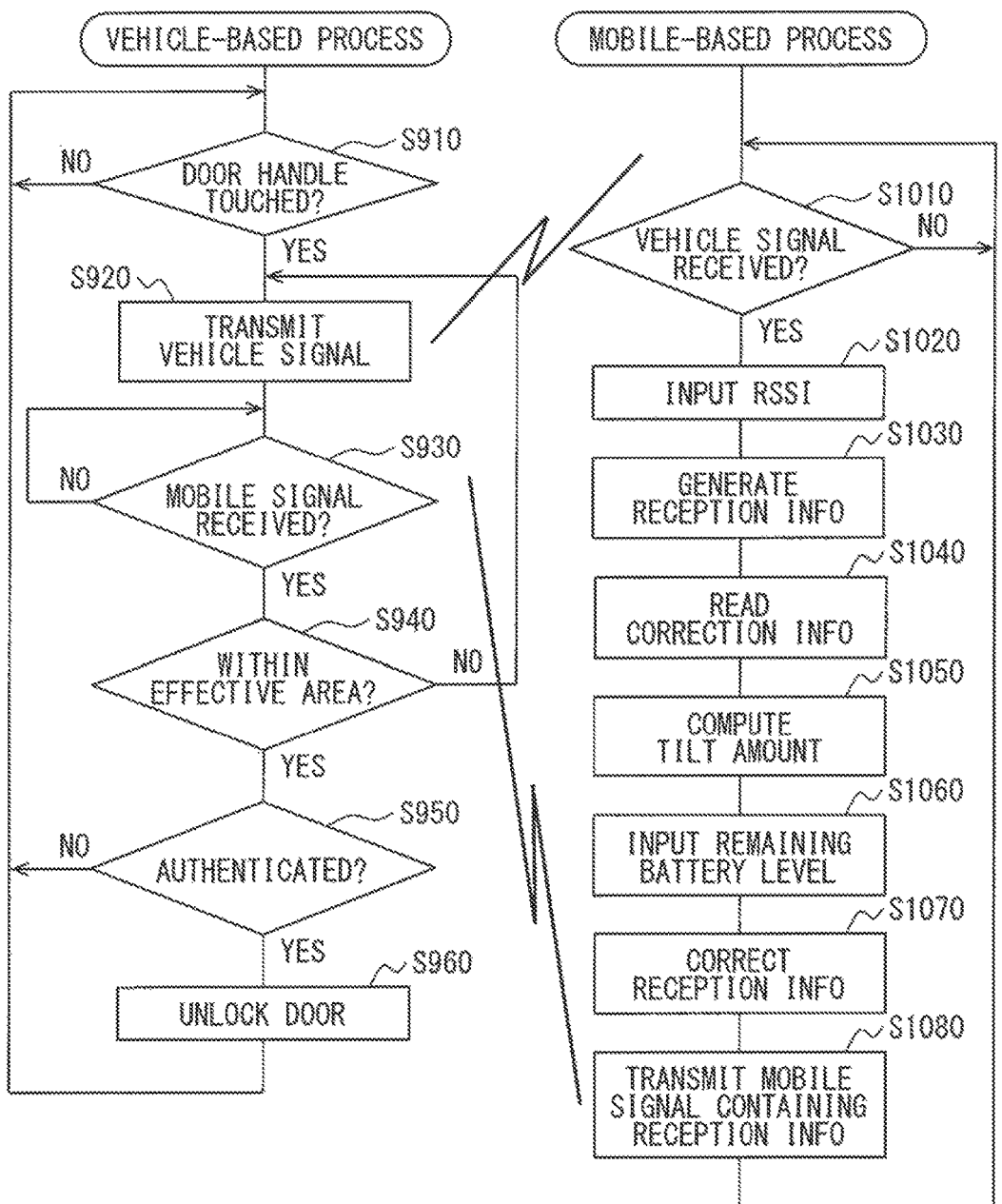
FIG. 9 is a flowchart illustrating an operation of the vehicle control system as example 5.

A flowchart in FIG. 9 is used to describe a mobile-based process performed by the control portion 13 of the mobile device 10 and a vehicle-based process performed by the control portion 23 of the onboard device 20 according to working example 2.

In the vehicle-based process, the control portion 23 determines, based on a detection signal from a sensor provided for the vehicle 2, whether or not a user touches the door handle at the driver's seat (S910). The control portion 23 may detect the touch manipulation on the door handle as a trigger (S910; YES). In this case, the control portion 23 allows the transmission portion 22 to wirelessly transmit a vehicle signal indicating a transmission request to the mobile device 10 (S920). The control portion 23 may not detect the touch manipulation on the door handle (S910; NO). In this case, the control portion 23 enters a wait state.

In the mobile-based process, the control portion 13 allows the reception portion 14 of the mobile device 10 to receive the vehicle signal (S1010). The control portion 13 is supplied with RSSI of the received vehicle signal from the strength measurement circuit 15 (S1020). Based on this RSSI, the control portion 13 generates reception information indicating the vehicle signal reception strength (S1030). The control portion 13 reads the correction information (including the model correction information) corresponding to a model of the mobile device 10 from the ROM 13b or the nonvolatile memory 13d (S1040). The control portion 13 computes the tilt amount of the mobile device 10 based on a detection value from the acceleration sensor 16 (S1050). The control portion 13 is supplied with the remaining battery level of the mobile device 10 from the remaining battery level computation circuit 17 (S1060). The control portion 13 adds the vehicle signal reception strength and a decrease in the reception strength of the mobile device 10 to correct the reception information based on the state information indicating the detected mobile state quantity (tilt amount and remaining battery level) and the correction information read from the ROM 13b or the nonvolatile memory 13d (S1070). The control portion 13 allows the transmission portion 12 to wirelessly transmit a mobile signal containing the corrected reception information and a specified authentication code (S1080). The control portion 13 may not detect reception of a vehicle signal (S1010; NO). In this case, the control portion 13 enters a wait state.

Finally, in the vehicle-based process, the control portion 23 determines whether or not the reception portion 24 of the onboard device 20 receives the mobile signal (S930). The control portion 23 may receive the mobile signal (S930; YES). In this case, based on the reception information attached to the received mobile signal, the control portion 23 determines whether or not the target distance corresponding to the vehicle signal reception strength in the mobile device 10 is smaller than or equal to the radial distance of an effective area, namely, whether or not the mobile device 10 is located within the effective area (S940). The control portion 13 may determine that the mobile device 10 is located within the effective area (S940; YES). In this case, based on the authentication code received along with the mobile signal, the control portion 23 determines whether or not the mobile device 10 is authenticated (S950). The control portion 23 may determine that the mobile device 10 is located outside the effective area (S940; NO). In this case, the control portion 23 returns to S920 without performing the determination based on the authentication code.

If successfully authenticating the mobile device 10 (S950; YES), the control portion 23 allows the actuator 26 to unlock a door of the vehicle 2 (S960) and returns to S910. The control portion 23 may determine that the mobile device 10 cannot be authenticated (S950; NO). In such a case, the control portion 23 returns to S910 without unlocking the door of the vehicle 2.

In the vehicle control system 1 according to working example 2, the onboard device 20 performs area determination based on the reception information (the vehicle signal reception strength in the mobile device 10) transmitted from the mobile device 10.

When transmitting reception information, the mobile device 10 corrects the vehicle signal reception strength correspondingly to a decrease in the reception sensitivity of the mobile device 10. The reception sensitivity depends on a way of using the mobile device 10 such as the orientation (tilt amount) or the remaining battery level when the vehicle signal is received.

The vehicle control system 1 according to working example 5 can more accurately determine whether or not the mobile device 10 is located within the effective area in accordance with a way of using the mobile device 10.

In working example 5, the control portion 13 to perform the process at S1010 exemplifies the mobile-based reception portion and the mobile-based reception means. The control portion 13 to perform the process at S1080 exemplifies the mobile-based transmission portion and the mobile-based transmission means. The control portion 13 to perform the process at S1020 exemplifies the strength measurement portion and the strength measurement means. The control portion 13 to perform the process at S1040 exemplifies a reception information provision portion and a reception information provision means. The control portion 23 to perform the process at S920 exemplifies the vehicle-based transmission portion and the vehicle-based transmission means. The control portion 23 to perform the process at S930 exemplifies the vehicle-based reception portion and the vehicle-based reception means. The ROM 23b or the nonvolatile memory 23d exemplifies the strength information storage portion and the strength information storage means. The control portion 23 to perform the process at S940 exemplifies the area determination portion and the area determination means. The acceleration sensor 16 and the remaining battery level computation circuit 17 exemplify the state detection portion and the state detection means. The control portion 13 to perform the process at S1030 exemplifies the correction information acquisition portion and the correction information acquisition means. The control portion 13 to perform the process at S1070 exemplifies a reception information correction portion and a reception information correction means.

Modification 5

The following describes a modification of the working example 5.

In the vehicle control system 1 according to working example 5, the mobile device 10 stores the correction information. Instead, the onboard device 20 may store the correction information. Namely, the mobile device 10 may acquire correction information from the onboard device 20.

In the vehicle control system 1 according to working example 5, the mobile device 10 may acquire environment information indicating the presence or absence of rain and environment correction information indicating characteristics of the reception strength corresponding to the presence or absence of rain. Based on these pieces of information, the mobile device 10 may correct the reception information (consequently the vehicle signal reception strength).

According to the present disclosure, a vehicle control system includes a mobile device carried by a vehicle user and an onboard device mounted on the vehicle. The vehicle control system performs wireless communication between the mobile device and the onboard device. The onboard device receives an authentication code unique to the vehicle from the mobile device when the mobile device is located within an effective area around a specified vehicular place in the vehicle. The onboard device accordingly provides vehicle control preassigned to the vehicle. The vehicle control system is available in various configurations.

In a vehicle control system according to a first example of the present disclosure, an onboard device includes a vehicle-based transmission portion that wirelessly transmits a specified vehicle signal using an antenna provided at the vehicular place when detecting a predetermined vehicle-based trigger. A mobile device includes a mobile-based reception portion and a strength measurement portion. The mobile-based reception portion receives the vehicle signal. The strength measurement portion measures reception strength of a vehicle signal received by the mobile-based reception portion. In the mobile device, a strength information storage portion identifies a target distance between the mobile device and the vehicular place. The strength information storage portion stores strength information indicating characteristics of the reception strength corresponding to the target distance. The area determination portion determines whether or not the mobile device is located within an effective area, based on reception strength measured by the strength measurement portion and strength information stored in the strength information storage portion. A determination signal transmission portion wirelessly transmits a specified determination signal when the area determination portion determines that the mobile device is located within the effective area.

In the vehicle control system according to the first example of the present disclosure, the mobile device performs the area determination based on the reception strength of a wireless signal (vehicle signal) transmitted from the onboard device. The mobile device uses a wireless signal (determination signal) to notify the onboard device that the mobile device is located within the effective area if this is the case.

In the mobile device, a state detection portion detects a mobile state quantity as at least one of a tilt amount of the mobile device with reference to a gravity direction and a remaining battery level of the mobile device. A correction information acquisition portion acquires correction information indicating characteristics of reception strength corresponding to the mobile state quantity. A strength information correction portion corrects strength information stored in the strength information storage portion based on the mobile state quantity detected by the state detection portion and the correction information acquired by the correction information acquisition portion when a vehicle signal is received.

In the vehicle control system according to this configuration, the mobile device corrects the vehicle signal reception strength in accordance with a reception capability of the mobile device. The reception capability of the mobile device depends on a way of using the mobile device such as an orientation (tilt amount) and a remaining battery level of the mobile device when a vehicle signal is received when performing area determination. The vehicle control system described in claim 1 is capable of more exactly determining whether or not the mobile device is located within an effective area in accordance with a way of using the mobile device.

The mobile device may store the correction information. Alternatively, the mobile device may receive the correction information along with a vehicle signal from the onboard device that stores the correction information. In the latter, the vehicle control system of the mobile-based transmission type can effectively exchange information when the onboard device transmits the correction information corresponding to a mobile signal to the mobile device. The correction information may be predetermined for a model of the mobile device.

In this type of the vehicle control system, the mobile device may acquire environment information indicating the presence or absence of rain and environment correction information indicating characteristics of reception strength in accordance with the presence or absence of rain. The mobile device may correct the strength information (consequently the vehicle signal reception strength) based on these pieces of information.

In a vehicle control system according to a second example of the present disclosure, a mobile device includes a mobile-based transmission portion to wirelessly transmit a specified mobile signal when detecting a predetermined mobile-based trigger. An onboard device includes a vehicle-based reception portion to receive a mobile signal and a strength measurement portion to measure reception strength of a mobile signal received by the vehicle-based reception portion. In the onboard device, a strength information storage portion stores strength information indicating characteristics of reception strength corresponding to the target distance. An area determination portion determines whether or not the mobile device is located within an effective area, based on reception strength measured by the strength measurement portion and strength information stored in the strength information storage portion.

In the vehicle control system according to the second example of the present disclosure, the onboard device performs area determination based on the reception strength of a wireless signal (mobile signal) transmitted from the mobile device.

In the mobile device, the state detection portion detects the mobile state quantity. A state information provision portion provides a mobile signal with state information that indicates a mobile state quantity detected by the state detection portion when the mobile signal is transmitted. In the onboard device, the correction information acquisition portion acquires correction information indicating characteristics of reception strength corresponding to a mobile state quantity. The strength information correction portion corrects the strength information stored in a strength information storage portion based on the state information received along with a mobile signal via the vehicle-based reception portion and correction information acquired from the correction information acquisition portion.

In the vehicle control system according to this configuration, the onboard device corrects the reception strength of a mobile signal in accordance with a transmission capacity of the mobile device when performing the area determination. The transmission capacity of the mobile device depends on a way of using the mobile device such as an orientation (tilt amount) and a remaining battery level of the mobile device when a mobile signal is transmitted. The vehicle control system described in claim 2 is capable of more exactly determining whether or not the mobile device is located within an effective area in accordance with a way of using the mobile device.

The onboard device may store the correction information. Alternatively, the onboard device may receive the correction information along with a mobile signal from the mobile device that stores the correction information. In the latter, the mobile device allows a correction information storage portion to store the correction information. The mobile device allows a correction information provision portion to provide a mobile signal with the correction information stored in the correction information storage portion. The onboard device may allow the correction information acquisition portion to receive the correction information along with the mobile signal via the vehicle-based reception portion. The onboard device need not store the correction information predetermined for each model of the mobile device. This enables to save a storage area of the onboard device and appropriately correct the reception strength of a mobile signal transmitted from various types of the mobile device.

In this type of the vehicle control system, the onboard device may acquire environment information indicating the presence or absence of rain and environment correction information indicating characteristics of reception strength in accordance with the presence or absence of rain. The onboard device may correct the strength information (consequently the vehicle signal reception strength) based on these pieces of information.

In a vehicle control system according to a third example of the present disclosure, a mobile device includes a mobile-based transmission portion to wirelessly transmit a specified mobile signal when detecting a predetermined mobile-based trigger. An onboard device includes a vehicle-based reception portion to receive a mobile signal and a strength measurement portion to measure reception strength of a mobile signal received by the vehicle-based reception portion. In the onboard device, a strength information storage portion stores strength information indicating characteristics of reception strength corresponding to the target distance. An area determination portion determines whether or not the mobile device is located within an effective area, based on reception strength measured by the strength measurement portion and strength information stored in the strength information storage portion.

In the vehicle control system according to the third example of the present disclosure, the onboard device performs area determination based on the reception strength of a wireless signal (mobile signal) transmitted from the mobile device.

In the mobile device, the state detection portion detects the tilt amount. The correction information acquisition portion acquires the correction information indicating characteristics of reception strength corresponding to the tilt amount. The transmission output adjustment portion adjusts mobile signal transmission output so as to correct the strength information stored in the strength information storage portion based on the tilt amount detected by the state detection portion and the correction information acquired by the correction information acquisition portion when a mobile signal is transmitted.

In the vehicle control system according to this configuration, the mobile device adjusts mobile signal transmission output so as to correct the reception strength of the onboard device in accordance with the transmission capacity of the mobile device. The transmission capacity of the mobile device depends on a way of using the mobile device such as an orientation (tilt amount) when a mobile signal is transmitted. The vehicle control system described in claim 3 is capable of more exactly determining whether or not the mobile device is located within an effective area in accordance with a way of using the mobile device.

The mobile device may store the correction information. Alternatively, the mobile device may receive the correction information along with a vehicle signal from the onboard device that stores the correction information. In the latter, the vehicle control system of the vehicle-based transmission type can effectively exchange information when the onboard device wirelessly transmits a transmission request to the mobile device before receiving a mobile signal. The mobile device receives the transmission request and transmits a response signal. The onboard device transmits the correction information corresponding to the response signal to the mobile device. This enables to efficiently exchange the information. The correction information may be predetermined for a model of the mobile device.

In this type of the vehicle control system, the mobile device may acquire environment information indicating the presence or absence of rain and environment correction information indicating characteristics of reception strength in accordance with the presence or absence of rain. The mobile device may adjust transmission output based on these pieces of information.

In a vehicle control system according to a fourth example of the present disclosure, an onboard device includes a vehicle-based reception portion and a vehicle-based transmission portion. The vehicle-based reception portion receives a specified mobile signal. When the vehicle-based reception portion receives a mobile signal, the vehicle-based transmission portion wirelessly transmits a specified vehicle signal via an antenna provided at a vehicular place. A mobile device includes a mobile-based transmission portion, a mobile-based reception portion, and a strength measurement portion. The mobile-based transmission portion wirelessly transmits a mobile signal when a predetermined mobile-based trigger is detected. The mobile-based reception portion receives a vehicle signal. The strength measurement portion measures reception strength of the vehicle signal received by the mobile-based reception portion. In the mobile device, a strength information storage portion stores strength information indicating characteristics of reception strength corresponding to the target distance. An area determination portion determines whether or not the mobile device is located within an effective area, based on the reception strength measured by the strength measurement portion and the strength information stored by the strength information storage portion. A determination signal transmission portion wirelessly transmits a specified determination signal when the area determination portion determines that the mobile device is located within an effective area.

In the vehicle control system according to the fourth example of the present disclosure, the mobile device performs the area determination based on the reception strength of a wireless signal (vehicle signal) transmitted from the onboard device that receives a wireless signal (mobile signal) from the mobile device. The mobile device uses a wireless signal (determination signal) to notify the onboard device that the mobile device is located within the effective area if this is the case.

In the mobile device, a state detection portion detects the remaining battery level. A state information provision portion provides a mobile signal with state information indicating the remaining battery level detected by the state detection portion when the mobile signal is transmitted. In the onboard device, a correction information acquisition portion acquires correction information indicating characteristics of reception strength corresponding to the remaining battery level. A transmission output adjustment portion adjusts vehicle signal transmission output so as to correct strength information stored in a strength information storage portion based on the state information received along with the mobile signal via vehicle-based reception portion and the correction information acquired by the correction information acquisition portion.

In the vehicle control system according to this configuration, the onboard device adjusts vehicle signal transmission output so as to correct reception strength of the mobile device in accordance with a reception capability of the mobile device. The reception capability of the mobile device depends on a remaining battery level of the mobile device when a mobile signal is transmitted. The vehicle control system described in claim 4 is capable of more exactly determining whether or not the mobile device is located within an effective area in accordance with a way of using the mobile device.

The onboard device may store the correction information. Alternatively, the onboard device may receive the correction information along with a mobile signal from the mobile device that stores the correction information. In the latter, the mobile device allows a correction information storage portion to store the correction information. The mobile device allows a correction information provision portion to provide a mobile signal with the correction information stored in the correction information storage portion. The onboard device may allow the correction information acquisition portion to receive the correction information along with the mobile signal via the vehicle-based reception portion. The onboard device need not store the correction information predetermined for each model of the mobile device. This enables to save a storage area of the onboard device and appropriately adjust transmission output of a vehicle signal transmitted to various types of the mobile device.

In this type of the vehicle control system, the onboard device may acquire environment information indicating the presence or absence of rain and environment correction information indicating characteristics of reception strength in accordance with the presence or absence of rain. The onboard device may adjust the transmission output based on these pieces of information.

In a vehicle control system according to a fifth example of the present disclosure, a mobile device includes a mobile-based reception portion and a mobile-based transmission portion. The mobile-based reception portion receives a specified vehicle signal. The mobile-based transmission portion wirelessly transmits a specified mobile signal when the mobile-based reception portion receives the vehicle signal. In the mobile device, a strength measurement portion measures reception strength of a vehicle signal received by the mobile-based reception portion. A reception information provision portion provides a mobile signal with reception information indicating the reception strength measured by the strength measurement portion.

The onboard device includes a vehicle-based transmission portion and a vehicle-based reception portion. The vehicle-based transmission portion wirelessly transmits a vehicle signal when a predetermined vehicle-based trigger is detected. The vehicle-based reception portion receives a mobile signal. In the onboard device, a strength information storage portion stores strength information indicating characteristics of the reception strength corresponding to a target distance. An area determination portion determines whether or not the mobile device is located within an effective area, based on reception information received along with a mobile signal via the vehicle-based reception portion and strength information stored in the strength information storage portion.

In the vehicle control system according to the fifth example of the present disclosure, the onboard device performs the area determination based on reception information (reception strength) attached to a wireless signal (mobile signal) transmitted from the mobile device that received a wireless signal (vehicle signal) from the onboard device.

In the mobile device, a state detection portion detects the mobile state quantity. A correction information acquisition portion acquires correction information indicating characteristics of reception strength corresponding to the mobile state quantity. A reception information correction portion corrects reception information the reception information provision portion attaches to a mobile signal based on the mobile state quantity detected by the state detection portion and the correction information acquired by the correction information acquisition portion when a vehicle signal is received.

The vehicle control system according to this configuration corrects the reception strength of the mobile device in accordance with the mobile device's reception capability depending on a way of using the mobile device such as the orientation (tilt amount) or the remaining battery level of the mobile device when a vehicle signal is received. The corrected reception strength is transmitted to the onboard device. The vehicle control system described in claim 5 is capable of more exactly determining whether or not the mobile device is located within an effective area in accordance with a way of using the mobile device.

The mobile device may store the correction information. Alternatively, the mobile device may receive the correction information along with a vehicle signal from the onboard device that stores the correction information. In the latter, the vehicle control system of the vehicle-based transmission type can effectively exchange information when the mobile device wirelessly transmits a transmission request to the onboard device before receiving a vehicle signal and receives a vehicle signal transmitted from the onboard device that received the transmission request. The correction information may be predetermined for a model of the mobile device.

In this type of the vehicle control system, the mobile device may acquire environment information indicating the presence or absence of rain and environment correction information indicating characteristics of reception strength in accordance with the presence or absence of rain. The mobile device may correct the reception strength based on these pieces of information.

While there have been illustrated embodiments and configurations according to the present disclosure, embodiments and configurations according to the disclosure are not limited to the respective embodiments and configurations illustrated above. The scope of embodiments and configurations according to the present disclosure also includes embodiments and configurations resulting from appropriately combining technical elements of different embodiments and configurations.

What is claimed is:
1. A vehicle control system comprising:
a mobile device carried by a user of a vehicle and an onboard device mounted on the vehicle,
wherein the onboard device performs vehicle control predetermined for the vehicle when wireless communication between the mobile device and the onboard device is performed and the onboard device receives an authentication code unique to the vehicle from the mobile device located within an effective area around a specified vehicular place in the vehicle, wherein the onboard device includes:
a vehicle-based transmitter to wirelessly transmit a specified vehicle signal via an antenna provided at the vehicular place when a predetermined vehicle-based trigger is detected;
wherein the mobile device includes:
a mobile-based receiver to receive the vehicle signal;
a strength measurement circuit to measure reception strength of the vehicle signal received by the mobile-based receiver;
a memory to settle a target distance between the mobile device and the vehicular place and store strength information indicating characteristics of the reception strength corresponding to the target distance;
a mobile-based microcomputer, including a mobile-based CPU, to determine whether or not the mobile device is located within the effective area, based on the reception strength measured by the strength measurement circuit and the strength information stored in the memory; and
a mobile-based transmitter to wirelessly transmit a specified determination signal when the mobile-based microcomputer determines that the mobile device is located within the effective area;
wherein the mobile device further includes:
a state detection portion that includes at least one of an acceleration sensor to detect a mobile state quantity as a tilt amount of the mobile device with reference to a gravity direction and a battery level computation circuit to detect the mobile state quantity as a remaining battery level of the mobile device, the mobile-based microcomputer acquiring correction information indicating characteristics of the reception strength corresponding to the mobile state quantity; and
the mobile-based microcomputer corrects the strength information stored in the memory based on
the mobile state quantity detected by the state detection portion at a time of receipt of the vehicle signal and
the correction information acquired by the mobile-based microcomputer,
wherein:
the reception strength of the vehicle signal measured by the strength measurement circuit of the mobile device varies with the mobile state quantity of the mobile device; and
the mobile-based microcomputer of the mobile device determines whether or not the mobile device is located within the effective area, based on:
(i) the reception strength of the vehicle signal measured by the strength measurement circuit; and
(ii) the strength information corrected based on the correction information and the mobile state quantity detected at the time of the receipt of the vehicle signal.

2. The vehicle control system according to claim 1, wherein the correction information is predetermined for a model of the mobile device.

3. A vehicle control system comprising:
a mobile device carried by a user of a vehicle and an onboard device mounted on the vehicle
wherein the onboard device performs vehicle control predetermined for the vehicle when wireless communication between the mobile device and the onboard device is performed and the onboard device receives an authentication code unique to the vehicle from the mobile device located within an effective area around a specified vehicular place in the vehicle,
wherein the mobile device includes:
a mobile-based transmitter to wirelessly transmit a specified mobile signal when a predetermined mobile-based trigger is detected;
wherein the onboard device includes:
a vehicle-based receiver to receive the mobile signal;
a strength measurement circuit to measure reception strength of the mobile signal received by the receiver;
a memory to settle a target distance between the mobile device and the vehicular place and store strength information indicating characteristics of the reception strength corresponding to the target distance; and
a mobile-based microcomputer, including a mobile-based CPU, to determine whether or not the mobile device is located within the effective area, based on the reception strength measured by the strength measurement circuit and the strength information stored in the memory;
wherein the mobile device further includes:
a state detection portion that includes at least one of an acceleration sensor to detect a mobile state quantity as a tilt amount of the mobile device with reference to a gravity direction and a battery level computation circuit to detect the mobile state quantity as a remaining battery level of the mobile device; and
the mobile-based microcomputer provides the mobile signal with state information indicating the mobile state quantity detected by the state detection portion at a time of transmission of the mobile signal;
wherein the onboard device further includes:
a vehicle-based microcomputer, including a vehicle-based CPU, to acquire correction information indicating characteristics of the reception strength corresponding to the mobile state quantity and to correct the strength information stored in the memory based on (i) the state information received from the mobile device along with the mobile signal via the vehicle-based receiver and indicating the mobile state quantity detected at the time of transmission of the mobile signal and (ii) the correction information acquired by the vehicle-based microcomputer,
wherein:
a transmission output level of the mobile signal varies with the mobile state quantity of the mobile device and the reception strength of the mobile signal measured by the onboard device varies with the mobile state quantity of the mobile device; and
the vehicle-based microcomputer determines whether or not the mobile device is located within the effective area, based on:
(i) the reception strength of the mobile signal measured by the strength measurement circuit; and
(ii) the strength information corrected based on the correction information and the state information indicating the mobile state quantity detected at the time of the transmission of the mobile signal.

4. The vehicle control system according to claim 3,
wherein the mobile device further includes:
a correction information storage portion to store the correction information; and
a correction information provision portion to provide the mobile signal with the correction information stored in the correction information storage portion; and
wherein the vehicle-based microcomputer receives the correction information along with the mobile signal via the vehicle-based receiver.

5. A vehicle control system comprising:
a mobile device carried by a user of a vehicle and an onboard device mounted on the vehicle, wherein the onboard device performs vehicle control predetermined for the vehicle when wireless communication between the mobile device and the onboard device is performed and the onboard device receives an authentication code unique to the vehicle from the mobile device located within an effective area around a specified vehicular place in the vehicle, wherein the mobile device includes:

a mobile-based transmitter to wirelessly transmit a specified mobile signal when a predetermined mobile-based trigger is detected;

wherein the onboard device includes:

a vehicle-based receiver to receive the mobile signal;

a strength measurement circuit to measure reception strength of the mobile signal received by the vehicle-based receiver;

a memory to settle a target distance between the mobile device and the vehicular place and store strength information indicating characteristics of the reception strength corresponding to the target distance; and a vehicle-based microcomputer, including a vehicle-based CPU, to determine whether or not the mobile device is located within the effective area, based on the reception strength measured by the strength measurement circuit and the strength information stored in the memory;

wherein the mobile device further includes:

an acceleration sensor to detect a tilt amount of the mobile device with reference to a gravity direction;

a mobile-based microcomputer, including a mobile-based CPU, to acquire correction information indicating characteristics of the reception strength corresponding to the tilt amount and to adjust a transmission output level of the mobile signal so as to correct the strength information stored in the memory based on the tilt amount detected by the acceleration sensor at a time of transmission of the mobile signal and the correction information acquired by the mobile-based microcomputer wherein:

the transmission output level of the mobile signal varies with the tilt amount of the mobile device and the reception strength of the mobile signal measured by the strength measurement circuit of the onboard device varies with the tilt amount of the mobile device;

the mobile-based transmitter of the mobile device wirelessly transmits the mobile signal with the transmission output level adjusted based on the correction information and the tilt amount of the mobile device detected at the time of transmission of the mobile signal; and the determination portion of the onboard device determines whether or not the mobile device is located within the effective area, based on (i) the reception strength of the mobile signal which is transmitted with the adjusted transmission output level from the mobile device and which is measured by the strength measurement circuit of the onboard device; and (ii) the strength information stored in the memory.

6. A vehicle control system comprising:

a mobile device carried by a user of a vehicle and an onboard device mounted on the vehicle, wherein the onboard device performs vehicle control predetermined for the vehicle when wireless communication between the mobile device and the onboard device is performed and the onboard device receives an authentication code unique to the vehicle from the mobile device located within an effective area around a specified vehicular place in the vehicle, wherein the onboard device includes:

a vehicle-based receiver to receive a specified mobile signal; and a vehicle-based transmitter to wirelessly transmit a specified vehicle signal via an antenna provided at the vehicular place when the vehicle-based receiver receives the mobile signal;

wherein the mobile device includes:

a mobile-based transmitter to wirelessly transmit the mobile signal when a predetermined mobile-based trigger is detected;

a mobile-based receiver to receive the vehicle signal;

a strength measurement circuit to measure reception strength of the vehicle signal received by the mobile-based receiver;

a memory to settle a target distance between the mobile device and the vehicular place and store strength information indicating characteristics of the reception strength corresponding to the target distance;

a mobile-based microcomputer, including a mobile-based CPU, to determine whether or not the mobile device is located within the effective area, based on the reception strength measured by the strength measurement circuit and the strength information stored in the memory; and a mobile-based transmitter to wirelessly transmit a specified determination signal when the mobile-based microcomputer determines that the mobile device is located within the effective area;

wherein the mobile device further includes:

a battery level computation circuit to detect a remaining battery level of the mobile device; and the mobile-based microcomputer provides the mobile signal with state information indicating the remaining battery level detected by the battery level computation circuit at a time of transmission of the mobile signal;

wherein the onboard device further includes:

a vehicle-based microcomputer, including a vehicle-based CPU, to acquire correction information indicating characteristics of the reception strength corresponding to the remaining battery level and to adjust a transmission output level of the vehicle signal so as to correct the strength information stored in the memory based on (i) tithe state information which is received from the mobile device along with the mobile signal via the vehicle-based receiver and which indicates the remaining battery level of the mobile device at the time of the transmission of the mobile signal and (ii) the correction information acquired by the vehicle-based microcomputer, wherein:

the transmission output level of the mobile signal varies with the remaining battery level of the mobile device; and the mobile-based microcomputer determines whether or not the mobile device is located within the effective area, based on:

(i) the reception strength of the vehicle signal measured by the strength measurement circuit of the mobile device, the transmission output level of the vehicle signal being adjusted based on the remaining battery level of the mobile device at the time of the transmission of the mobile signal; and (ii) the strength information stored in the memory.

7. A vehicle control system comprising:
a mobile device carried by a user of a vehicle and an onboard device mounted on the vehicle,
wherein the onboard device performs vehicle control predetermined for the vehicle when wireless communication between the mobile device and the onboard device is performed and the onboard device receives an authentication code unique to the vehicle from the mobile device located within an effective area around a specified vehicular place in the vehicle,
wherein the mobile device includes:
a mobile-based receiver to receive a specified vehicle signal;
a mobile-based transmitter to wirelessly transmit a specified mobile signal when the mobile-based receiver receives the vehicle signal;
a strength measurement circuit to measure reception strength of the vehicle signal received by the mobile-based receiver; and
a mobile-based microcomputer, including a mobile-based CPU, to provide the mobile signal with reception information indicating the reception strength measured by the strength measurement circuit;
wherein the onboard device includes:
a vehicle-based transmitter to wirelessly transmit the vehicle signal when a predetermined vehicle-based trigger is detected;
a vehicle-based receiver to receive the mobile signal;
a memory to settle a target distance between the mobile device and the vehicular place and store strength information indicating characteristics of the reception strength corresponding to the target distance; and
a vehicle-based microcomputer, including a vehicle-based CPU, to determine whether or not the mobile device is located within the effective area, based on the reception information received along with the mobile signal via the vehicle-based receiver and the strength information stored in the memory;

wherein the mobile device further includes a state detection portion that includes at least one of an acceleration sensor to detect a mobile state quantity as a tilt amount of the mobile device with reference to a gravity direction and a battery level computation circuit to detect the mobile state quantity as a remaining battery level of the mobile device; and the mobile-based microcomputer acquires correction information indicating characteristics of the reception strength corresponding to the mobile state quantity and corrects the reception information attached to the mobile signal by the mobile-based microcomputer based on the mobile state quantity detected by the state detection portion at a time of receipt of the vehicle signal and the correction information acquired by the mobile-based microcomputer, wherein:

the reception strength of the vehicle signal measured by the strength measurement circuit of the mobile device varies with the mobile state quantity of the mobile device;

the mobile device transmits the mobile signal along with the corrected reception information which indicates the measured reception strength of the vehicle signal corrected based on the mobile state quantity detected at the time of the receipt of the vehicle signal; and the vehicle-based microcomputer determines whether or not the mobile device is located within the effective area, based on (i) the corrected reception information received from the mobile device along with the mobile signal via the vehicle-based receiver and (ii) the strength information stored in the memory.

* * * * *